US012091906B2

(12) United States Patent
Neuner et al.

(10) Patent No.: US 12,091,906 B2
(45) **Date of Patent: *Sep. 17, 2024**

(54) THERMALLY ENHANCED MULTI-COMPONENT GLASS DOORS AND WINDOWS

(71) Applicant: Quaker Window Products Co., Freeburg, MO (US)

(72) Inventors: Ben Neuner, Columbia, MO (US); Curtis Weavers, Vienna, MO (US); Aaron Haller, Freeburg, MO (US)

(73) Assignee: Quaker Window Products Co., Freeburg, MO (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/171,446

(22) Filed: Feb. 9, 2021

(65) Prior Publication Data

US 2021/0164287 A1 Jun. 3, 2021

Related U.S. Application Data

(63) Continuation of application No. 16/168,305, filed on Oct. 23, 2018, now Pat. No. 10,947,772, which is a (Continued)

(51) Int. Cl.

*E05D 15/06* (2006.01)
*E06B 3/24* (2006.01)

(Continued)

(52) U.S. Cl.

CPC .............. *E06B 3/6715* (2013.01); *E06B 3/24* (2013.01); *E06B 3/26301* (2013.01);

(Continued)

(58) Field of Classification Search

CPC ...... E06B 3/6715; E06B 3/24; E06B 3/26301; E06B 3/304; E06B 3/305; E06B 3/64;

(Continued)

(56) References Cited

U.S. PATENT DOCUMENTS 498,119 A 5/1893 Horton
1,490,906 A 4/1924 Ballard (Continued)

FOREIGN PATENT DOCUMENTS

CA 2361786 A1 5/2002
CA 2910225 A1 4/2016

(Continued)

OTHER PUBLICATIONS

America Italiana (webpage), "AL 100 SHT-Wood Clad Alu Passive House Line—America Italiana Passive House Windows", pdf printed Jun. 7, 2017, 2 pps. URL: http://americaitaliana.com/passive-house-windows/al100sth-wood-clad-alu-passive-house-line.html.

(Continued)

*Primary Examiner* — Jerry E Redman
(74) *Attorney, Agent, or Firm* — Armstrong Teasdale LLP

(57) ABSTRACT

A building component includes a first glass pane connected to a second glass pane to form an insulated glass unit. The first glass pane and the second glass pane define a pocket therebetween. The insulated glass unit is positioned in a frame. The building component includes an insulating material in the middle portion of the frame. The insulating material defines a continuous frame thermal break extending through the frame. The frame thermal break is aligned with the pocket. The frame thermal break has a width of at least 1 inch. The pocket has a width that is less than the width of the frame thermal break.

24 Claims, 27 Drawing Sheets

Related U.S. Application Data continuation-in-part of application No. 15/791,471, filed on Oct. 24, 2017, now Pat. No. 10,107,027.

(51) Int. Cl.

| | |
|---|---|
| ***E06B 3/263*** | (2006.01) |
| ***E06B 3/30*** | (2006.01) |
| ***E06B 3/64*** | (2006.01) |
| ***E06B 3/67*** | (2006.01) |
| ***E06B 3/673*** | (2006.01) |
| *E06B 3/36* | (2006.01) |
| *E06B 3/46* | (2006.01) |
| *E06B 3/58* | (2006.01) |
| *E06B 3/92* | (2006.01) |
| *E06B 3/964* | (2006.01) |

(52) U.S. Cl.
CPC .............. *E06B 3/304* (2013.01); *E06B 3/305* (2013.01); *E06B 3/64* (2013.01); *E06B 3/673* (2013.01); *E06B 2003/26332* (2013.01); *E06B 3/26341* (2013.01); *E06B 3/36* (2013.01); *E06B 3/469* (2013.01); *E06B 3/5821* (2013.01); *E06B 3/5828* (2013.01); *E06B 3/922* (2013.01); *E06B 3/9645* (2013.01)

(58) Field of Classification Search
CPC ........ E06B 3/673; E06B 3/26341; E06B 3/36; E06B 3/5821; E06B 3/5828; E06B 3/922; E06B 3/9645; E06B 2003/26332
See application file for complete search history.

(56) References Cited

U.S. PATENT DOCUMENTS

| | | | | |
|---|---|---|---|---|
| 1,614,942 | A | 1/1927 | Ballard | |
| 2,157,425 | A | 5/1939 | Nelson | |
| 2,157,426 | A | 5/1939 | Nelson | |
| 2,231,530 | A | 2/1941 | Edwards | |
| 2,243,735 | A | 5/1941 | Leahy | |
| 2,564,265 | A | 8/1951 | Knott | |
| 2,642,632 | A | 6/1953 | Savage | |
| 2,877,515 | A * | 3/1959 | Haas | E06B 3/26301 52/204.593 |
| 3,667,179 | A | 6/1972 | Eisenberg | |
| 3,694,985 | A | 10/1972 | Spaiches | |
| 3,958,383 | A | 5/1976 | Dallen | |
| 3,994,109 | A | 11/1976 | Pandell | |
| 4,081,934 | A * | 4/1978 | Franz | E06B 3/66366 52/786.13 |
| 4,115,972 | A * | 9/1978 | Varlonga | E06B 3/26307 52/204.593 |
| 4,296,587 | A | 10/1981 | Berdan | |
| 4,513,546 | A | 4/1985 | Gow | |
| 4,558,536 | A | 12/1985 | Dunsmoor | |
| 4,569,154 | A | 2/1986 | Bayer | |
| 4,614,062 | A | 9/1986 | Sperr | |
| 4,720,951 | A | 1/1988 | Thorn et al. | |
| 4,837,977 | A | 6/1989 | Mauro | |
| 4,875,316 | A | 10/1989 | Johnston | |
| 4,982,530 | A | 1/1991 | Palmer | |
| 5,081,793 | A | 1/1992 | Mauro | |
| 5,491,951 | A | 2/1996 | Riegelman | |
| 5,938,888 | A | 8/1999 | Valentin | |
| 6,129,805 | A | 10/2000 | Valentin | |
| 6,202,353 | B1 | 3/2001 | Giacomelli | |
| 6,964,290 | B2 | 11/2005 | Woodward et al. | |
| 7,552,562 | B2 | 6/2009 | Curtis et al. | |
| 7,987,633 | B2 | 8/2011 | Lenox | |
| 8,529,716 | B2 | 9/2013 | Davies et al. | |
| 8,534,010 | B2 | 9/2013 | Joray | |
| 8,561,365 | B2 | 10/2013 | Albrecht et al. | |
| 8,635,819 | B2 | 1/2014 | Joray | |
| 9,187,949 | B2 | 11/2015 | Trpkovski et al. | |
| 9,428,953 | B2 | 8/2016 | Briese et al. | |
| 9,441,412 | B1 * | 9/2016 | Hooper, Jr. | E06B 3/5821 |
| 10,107,027 | B1 * | 10/2018 | Weavers | E06B 3/08 |
| 10,184,288 | B2 | 1/2019 | Blijeweert | |
| 10,837,219 | B2 * | 11/2020 | Weavers | E06B 3/6715 |
| 10,947,772 | B2 * | 3/2021 | Weavers | E06B 3/305 |
| 11,111,717 | B1 * | 9/2021 | Mazur | E06B 3/663 |
| 11,608,673 | B1 * | 3/2023 | Mazur | E06B 3/5821 |
| 2005/0262782 | A1 | 12/2005 | Harrison et al. | |
| 2006/0070301 | A1 | 4/2006 | Fisher et al. | |
| 2008/0086961 | A1 | 4/2008 | Westermann | |
| 2008/0196342 | A1 | 8/2008 | Franklin | |
| 2009/0277111 | A1 | 11/2009 | Albrecht et al. | |
| 2011/0011006 | A1 | 1/2011 | Wuest et al. | |
| 2011/0107672 | A1 | 5/2011 | Curtis | |
| 2012/0036810 | A1 | 2/2012 | Joray | |
| 2012/0102864 | A1 | 5/2012 | Eisenbach et al. | |
| 2012/0285614 | A1 | 11/2012 | Davies et al. | |
| 2013/0042552 | A1 | 2/2013 | Trpkovski et al. | |
| 2013/0312342 | A1 | 11/2013 | Joray | |
| 2014/0053488 | A1 | 2/2014 | Lenox et al. | |
| 2015/0361713 | A1 | 12/2015 | Briese et al. | |
| 2016/0340962 | A1 | 11/2016 | Briese et al. | |
| 2017/0037674 | A1 * | 2/2017 | Hooper | E06B 3/263 |
| 2018/0010381 | A1 * | 1/2018 | Crist | E06B 7/32 |
| 2019/0119972 | A1 * | 4/2019 | Weavers | E06B 3/08 |
| 2019/0119974 | A1 * | 4/2019 | Weavers | E06B 3/24 |
| 2021/0164287 | A1 * | 6/2021 | Neuner | E06B 3/6715 |
| 2022/0090439 | A1 * | 3/2022 | Baca | E05B 65/0071 |

FOREIGN PATENT DOCUMENTS

| | | | | |
|---|---|---|---|---|
| CA | 3116967 | A1 * | 11/2021 | E06B 3/22 |
| CH | 706561 | A1 | 11/2013 | |
| CN | 2323038 | Y | 6/1999 | |
| CN | 201246067 | Y | 5/2009 | |
| CN | 201620702 | U | 11/2010 | |
| CN | 201671511 | U | 12/2010 | |
| CN | 202299948 | U | 7/2012 | |
| CN | 202325022 | U | 7/2012 | |
| CN | 203412475 | U | 1/2014 | |
| DE | 3242909 | C2 | 5/1984 | |
| EP | 23412 | A1 | 2/1981 | |
| EP | 23412 | B1 | 7/1984 | |
| EP | 180447 | A2 | 5/1986 | |
| EP | 243305 | A2 | 10/1987 | |
| EP | 243305 | A3 | 3/1988 | |
| EP | 790087 | A1 | 8/1997 | |
| EP | 638377 | B1 | 2/1998 | |
| EP | 947302 | B1 | 9/2002 | |
| EP | 1117890 | B1 | 3/2006 | |
| EP | 2220320 | A1 | 8/2010 | |
| ES | 2926099 | A2 * | 10/2022 | E06B 3/22 |
| FR | 2714693 | A1 * | 7/1995 | E06B 3/308 |
| FR | 2971808 | A1 * | 8/2012 | E06B 3/26301 |
| JP | 2002114542 | A | 4/2002 | |
| WO | 9119877 | A1 | 12/1991 | |
| WO | 2008036305 | A1 | 3/2008 | |
| WO | 2014071492 | A1 | 5/2014 | |
| WO | 2016098839 | A1 | 6/2016 | |
| WO | 2017072660 | A1 | 5/2017 | |
| WO | WO-2019234381 | A1 * | 12/2019 | E06B 3/5409 |

OTHER PUBLICATIONS

Made-in-China.com (webpage), "Solid Teak Wood Clad Aluminium Casement Window", pdf printed Oct. 20, 2017, 3 pps. URL: http://doorwin.en.made-in-china.com/product/zeUxrGwCZjps/China-Solid-Teak-Wood-Clad-Aluminium-Casement-Window.html.

Sierra Pacific Windows (webpage), "H3™ high-tech mid-priced window" (Promo Page), pdf printed Oct. 20, 2017, 1 pps. URL: http://hurd.com/homeowner-qa/whats-your-biggest-bargain.

Sierra Pacific Windows (webpage), "H3™ high-tech mid-priced window" (Main Page), pdf printed Oct. 20, 2017, 1 pps. URL: http://hurd.com/h3-high-tech-mid-priced-windows.

(56) References Cited

OTHER PUBLICATIONS

Marvin Family of Windows (webpage), "Wood Ultrex Fiberglass—Integrity Windows", pdf printed Oct. 20, 2017, 12 pps. URL: http://www.marvin.com/integrity/features/wood-ultrex-series.
Diy Trade (website image), "SuperBalum", pdf printed Oct. 20, 2017, 1 pps. URL: http://img.diytrade.com/seimg/2166602/40255632/Aluminium_clad_Wood_Window.jpg.
SuperBalum (Foshan Sun Aluminium Door Window Limited), main page, pdf printed Oct. 20, 2017, 4 pps. URL: http://www.superbalum.com/.
ArchiProducts (webpage), "Aluminum-Wooden Windows", pdf printed Oct. 20, 2017, 7 pps. URL: http://www.archiproducts.com/en/products/aluminium-wooden-windows.
PCC Windows (webpage), "Aluminum Wood Wood Casement Window", pdf printed Oct. 20, 2017, 4 pps. URL: http://pccwindows.en.ec21.com/Aluminum_Wood_Wood_Casement_Window--6646336_6651542.html.
Panda Windows and Doors (website pdf), S-46 AW specs, pdf downloaded Oct. 22, 2017, 4 pps. URL: http://www.panda-windows.com/wp-includes/images/downloads/Tech/S.46.pdf.
Panda Windows and Doors (webpage), "The S.46", pdf printed Oct. 22, 2017, 5 pps. URL: http://www.panda-windows.com/products/by-type/windows/s-46.
Panda Windows and Doors (webpage), main page, pdf printed prior to Oct. 20, 2017, 6 pps, original URL not available.
Non-Final Office Action issued by the USPTO, for U.S. Appl. No. 16/168,305, Sep. 21, 2020,19 pps.
"E600 Series Casement", Product Brochure, Quaker, Mar. 2021.
"E600 Series Picture Window (Fixed)", Product Brochure, Quaker, Jan. 2019.
"Masterline 8 Windows and Doors", Product Brochure, Reynaers Aluminum, Jun. 2019.
"T200 Series Picture Window (Fixed)", Product Brochure, Quaker, Jan. 2019.
Petition for IPR of U.S. Pat. No. 10,107,027, dated Jun. 16, 2022, 108 pages.
Window and Wall Systems Webpages, archived on Sep. 5, 2015, 10 pages.
Decision Granting Institution of IPR of U.S. Pat. No. 10,107,027, dated Jan. 4, 2023, 24 pages.
Declaration of Ken Bettger in Support of Petition for IPR of U.S. Pat. No. 10,107,027, dated Jun. 16, 2022, 109 pages.

* cited by examiner

THERMALLY ENHANCED MULTI-COMPONENT GLASS DOORS AND WINDOWS

CROSS-REFERENCE TO RELATED APPLICATION

This application is a continuation of U.S. patent application Ser. No. 16/168,305, filed on Oct. 23, 2018, and granted as U.S. Pat. No. 10,947,772, which is a continuation-in-part of U.S. patent application Ser. No. 15/791,471, filed on Oct. 24, 2017, and granted as U.S. Pat. No. 10,107,027, the disclosures of which are hereby incorporated by reference in their entirety.

FIELD

The field relates to building components and, in particular, glass doors and windows that include a pocket defined by glass panes and a thermal break aligned with the pocket.

BACKGROUND

Windows and glass doors typically include a frame supporting one or more glass panes. The frame may be constructed of various materials that provide structural strength or a desired aesthetic appearance. However, such materials may be difficult to connect to each other and may increase the cost of the door. In addition, prior windows and doors have not been completely satisfactory in preventing heat transfer between an interior and exterior of a structure.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a method of assembling a door includes positioning an insulating material in a thermal break defined by a frame intermediate a first side and a second side of the door. The method also includes connecting a first glass pane to a second glass pane to form an insulated glass unit. A pocket is defined between the first glass pane and the second glass pane. The method further includes positioning the insulated glass unit in the frame and aligning the thermal break and the pocket such that a distance between a central plane of the thermal break and a central plane of the pocket is in a range of up to about 0.75 inches when the door is in a closed position. The method also includes connecting a cladding to the frame. The frame includes a first material visible on the first side of the door. The cladding includes a second material visible on the second side of the door. The frame defines a cavity that extends between the first side and the second side and is configured to inhibit moisture from the first side contacting the second material.

In another aspect, a method of assembling a door includes positioning an insulating material in a first thermal break defined by a frame intermediate a first side and a second side of the door and connecting a first glass pane to a second glass pane to form an insulated glass unit. A pocket is defined between the first glass pane and the second glass pane. A central plane extends through the pocket and is spaced equal distances from the first glass pane and the second glass pane. The method also includes positioning a panel frame in the frame. The panel frame defines a second thermal break intermediate the first side and the second side. The method further includes connecting the insulated glass unit to the panel frame and aligning the second thermal break and the pocket such that the central plane extends through the second thermal break. The first thermal break, the second thermal break, and the pocket define a continuous thermal break when the door is in a closed position. The method includes connecting a cladding to the frame. The frame includes a first material visible on the first side of the door and a second material visible on the second side of the door. The frame defines a cavity that extends between the first side and the second side and is configured to inhibit moisture from the first side contacting the second material.

In yet another aspect, a method of assembling a building component includes connecting a first glass pane to a second glass pane to form an insulated glass unit. The first glass pane and the second glass pane define a pocket therebetween. A central plane extends through the pocket and is spaced equal distances from the first glass pane and the second glass pane. The method further includes positioning the insulated glass unit in a frame. The frame includes a first material visible on a first side of the building component. A thermal break is defined by a middle portion of the frame and circumscribes the insulated glass unit. The middle portion of the frame supports the insulated glass unit. The method also includes connecting cladding including a second material to the frame. The second material is visible on a second side of the building component. The frame defines a cavity that extends between the first side and the second side and is configured to inhibit moisture from the first side contacting the second material. The method also includes aligning the thermal break and the pocket such that the central plane extends through a middle portion of the thermal break. The thermal break and the pocket define a continuous thermal break extending through the building component.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
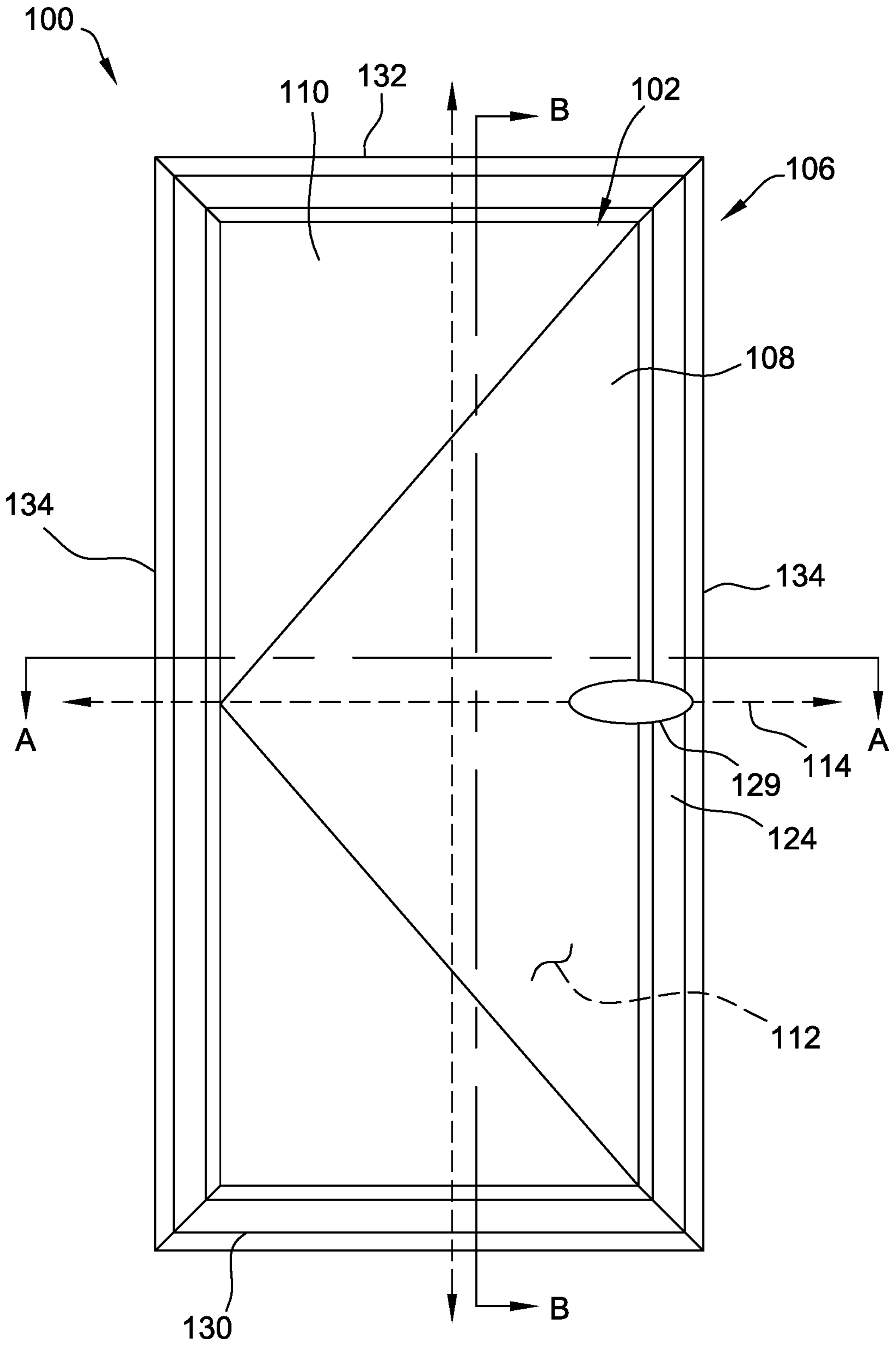
FIG. 1 is an elevation view of an example door.
Figure 2:
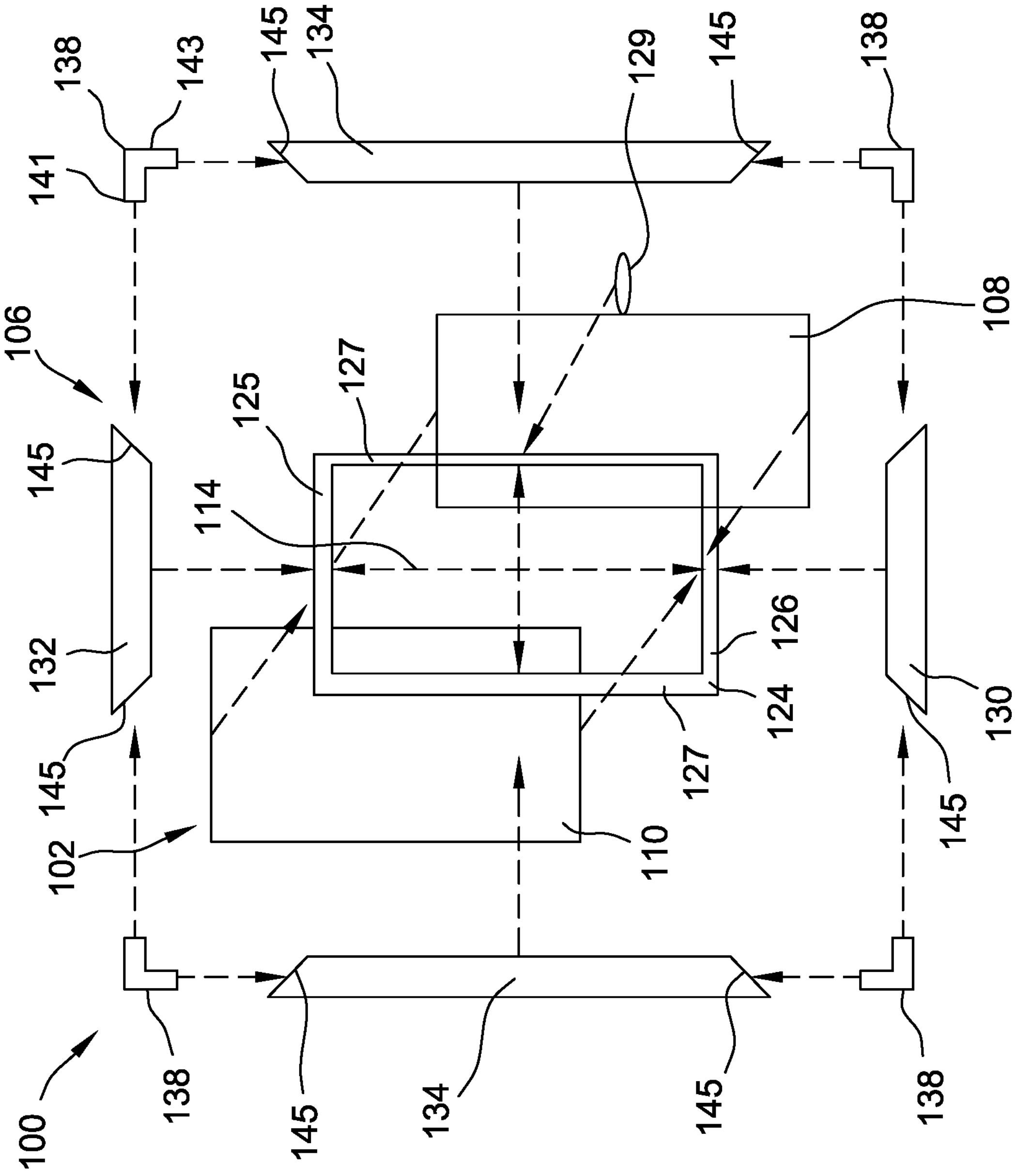
FIG. 2 is an exploded assembly view of the door shown in FIG. 1.

Referring to FIGS. 1 and 2, an example door is indicated generally by 100. The door 100 includes an insulated glass unit 102 and a frame 106. The insulated glass unit 102 includes a first glass pane 108 and a second glass pane 110. The second glass pane 110 is spaced from the first glass pane 108 such that the first glass pane and the second glass pane define a pocket 112 therebetween. A central plane 114 extends through the pocket 112 and is spaced equal distances from the first glass pane 108 and the second glass pane 110. The pocket 112 may be filled with an insulating material such as argon gas. In other embodiments, the door 100 may include any insulated glass unit 102 that enables the door to function as described. For example, in some embodiments, a third glass pane may be disposed between the first glass pane 108 and the second glass pane 110 and generally aligned with the central plane 114.

In addition, the door 100 includes a panel frame 124 circumscribing the insulated glass unit 102. The panel frame 124 includes a top rail 125, a bottom rail 126, and stiles 127. The rails 125, 126 extend horizontally and the stiles 127 extend vertically. The insulated glass unit 102 may be secured to the top rail 125, the bottom rail 126, and the stiles 127 by a glazing stop. In the example, the top rail 125, the bottom rail 126, the stiles 127, and the insulated glass unit 102 may be connected to the frame 106 such that the insulated glass unit 102, the top rail 125, the bottom rail 126, and the stiles 127 are positionable relative to the frame 106. For example, in some embodiments, the insulated glass unit 102, the top rail 125, the bottom rail 126, and the stiles 127 may be pivotable and/or slidable relative to the frame 106. The door 100 may include hardware such as a handle 129 and hinges 131 (shown in FIG. 3) to enable the insulated glass unit 102 and the panel frame 124 to be positionable relative to the frame 106. In some embodiments, the door 100 may include rollers, locks, and snubbers. In other embodiments, the insulated glass unit 102, the top rail 125, the bottom rail 126, and the stiles 127 may be positioned in the frame 106 in any manner that enables the door 100 to operate as described. For example, in some embodiments, the door 100 includes two or more panels that are movable relative to the frame 106. Accordingly, the door may be, for example and without limitation, a swing door, a sliding door, a multi-slide door, a bi-fold door, and a multi-fold door.

In reference to FIG. 2, the frame 106 includes a sill 130, a header 132, jambs 134, cladding 136 (shown in FIGS. 4 and 5), and corner keys 138. In the example, the sill 130 and the header 132 extend horizontally and define a width of the door 100. The jambs 134 extend vertically and define a height of the door 100. Together the sill 130, the header 132 and the jambs 134 are configured to circumscribe and support the first glass pane 108 and the second glass pane 110. In the illustrated embodiment, the frame 106 is rectangular. A threshold may extend across at least a portion of the sill 130. In other embodiments, the door 100 may include any frame 106 that enables the door to function as described.

Figure 3:
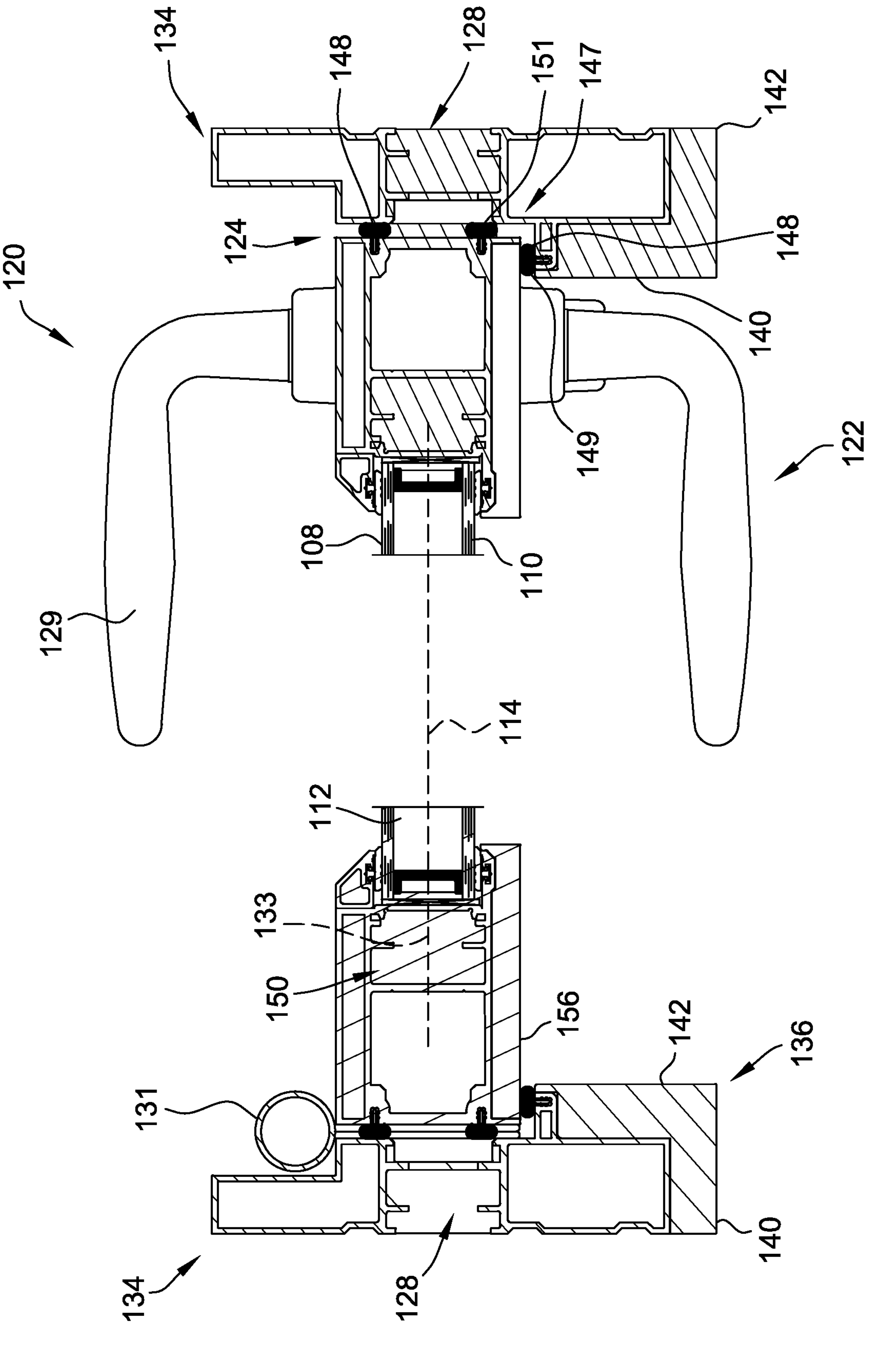
FIG. 3 is a sectional foreshortened view of the door shown in FIG. 1, taken along section line A-A.
Figure 4:
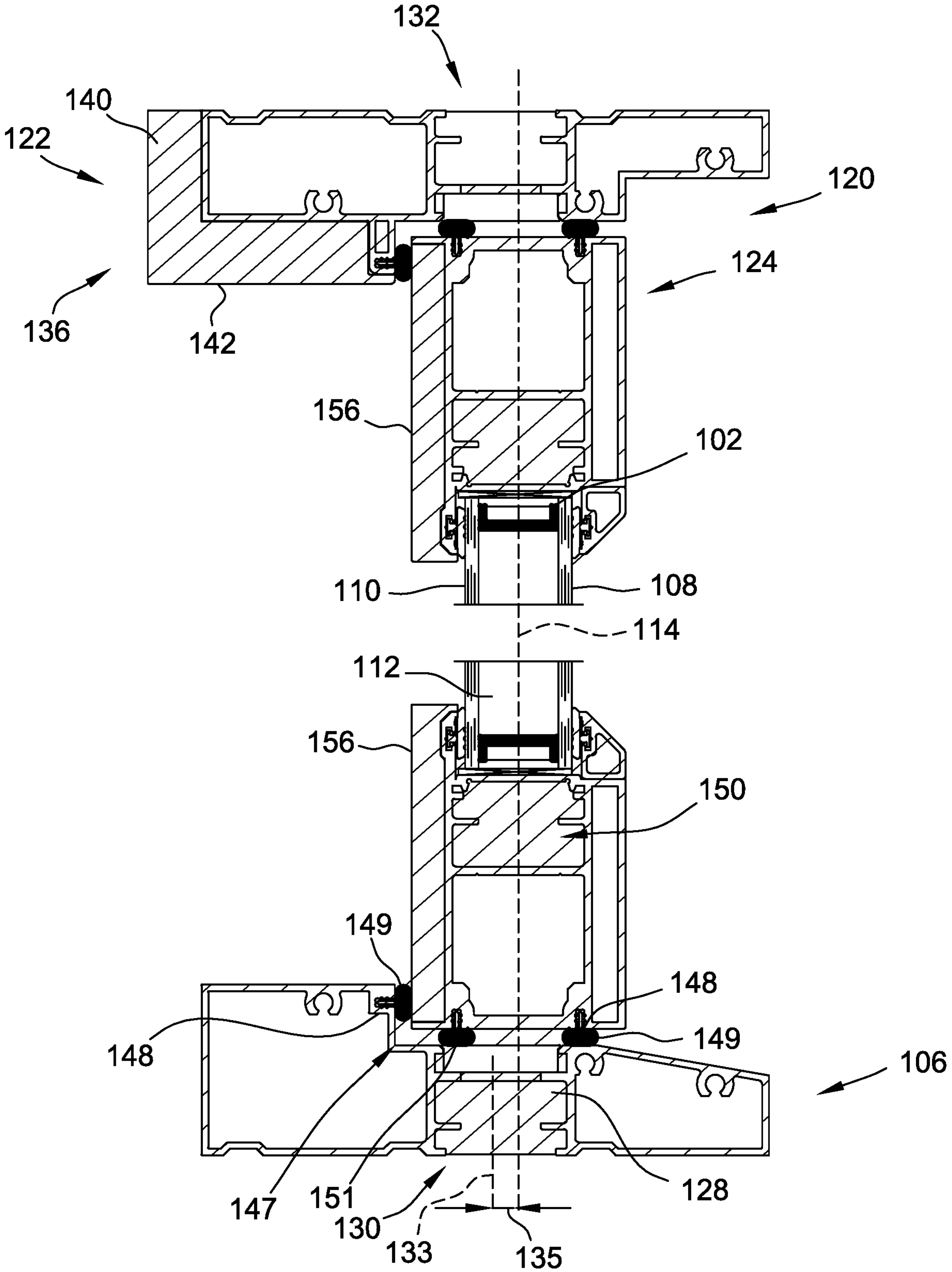
FIG. 4 is a sectional foreshortened view of a portion of the door shown in FIG. 1, taken along section line B-B.
Figure 5A:
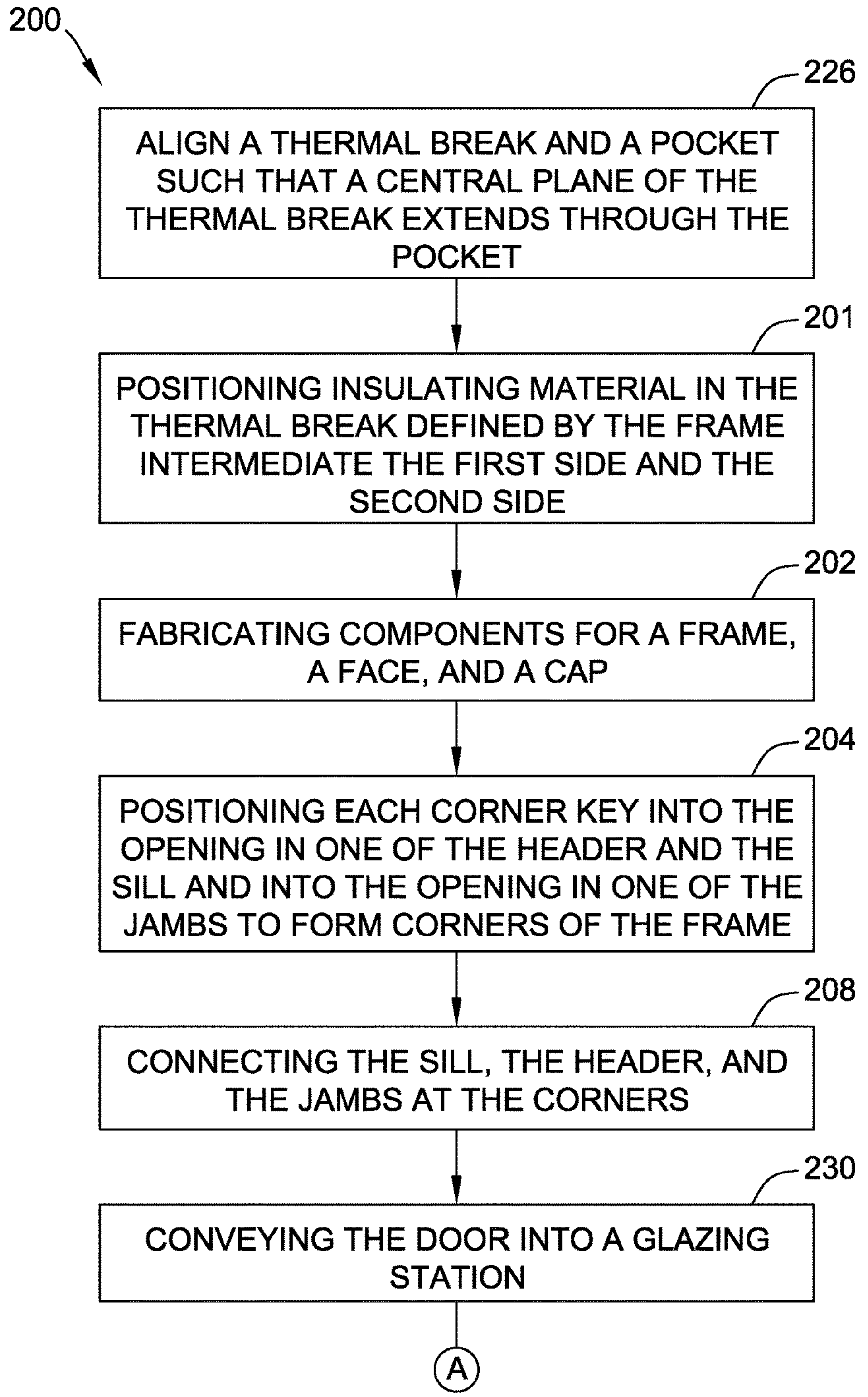
FIG. 5 depicts a flow chart of an example method of assembling the door shown in FIG. 1.
Figure 5B:
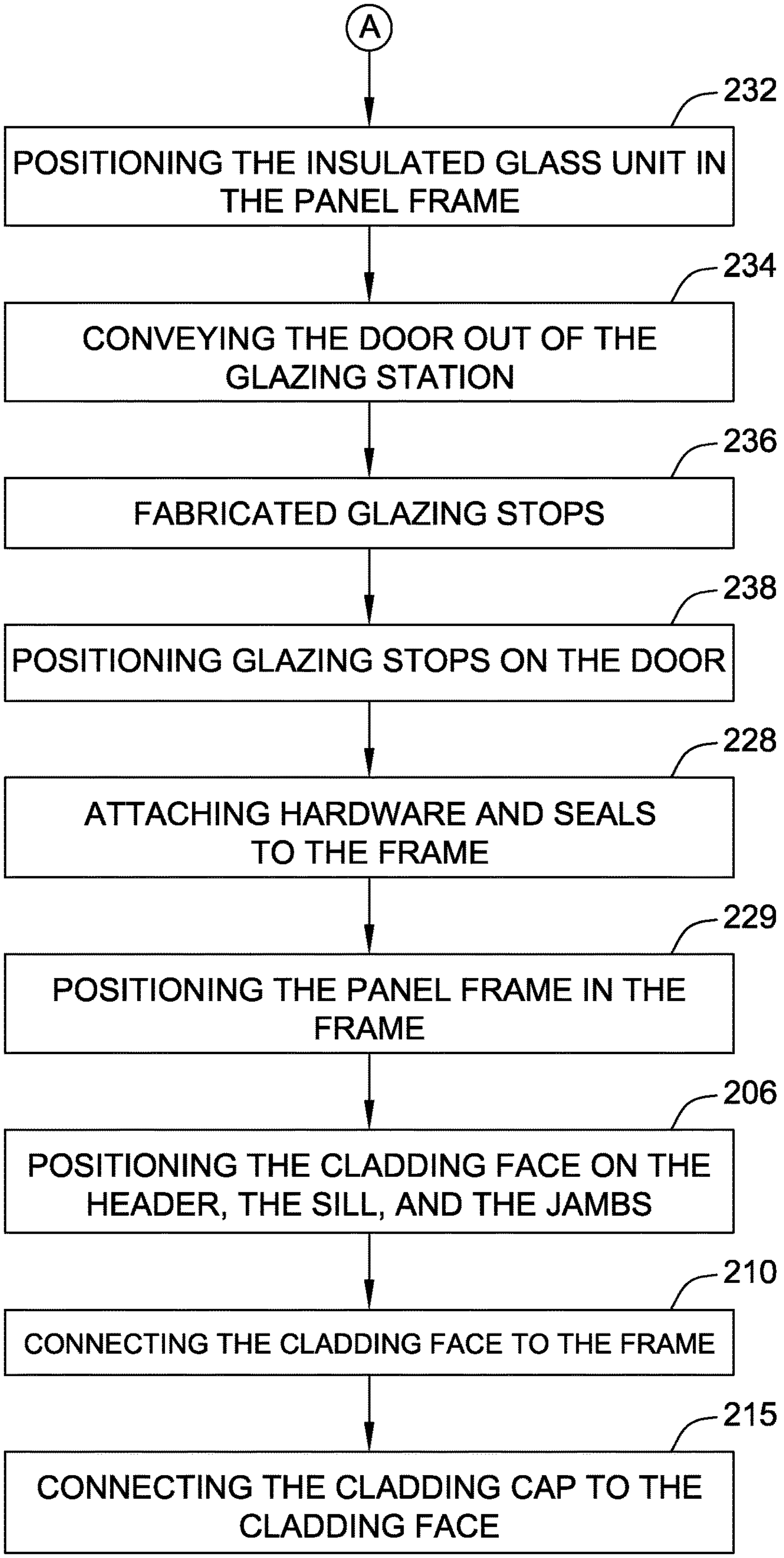

In reference to FIGS. 2-4, each corner key 138 is sized and shaped to extend into openings 145 in the sill 130, the header 132, and the jambs 134. Also, the door 100 may include screw or fastener connection assemblies to connect the sill 130, the header 132, and the jambs 134 together. In addition, the corner keys 138 are shaped to connect the sill 130, the header 132, and the jambs 134 in conjunction with the screw connection assemblies such that the sill, the header and the jambs extend at angles relative to each other. For example, in the illustrated embodiment, each corner key 138 defines a right angle. In other embodiments, the frame 106 may include any corner keys 138 that enable the door 100 to function as described.

As shown in FIG. 4, in this embodiment, the cladding 136 includes a face 140 and a cap 142. In other embodiments, the door 100 may include any cladding 136 that enables the door to function as described. For example, in some embodiments, the cladding 136 includes an extension jamb.

The face 140 is configured to connect to the header 132, and the jambs 134. The face 140 includes plates that cover surfaces of the header 132, and the jambs 134. The cap 142 attaches to the face 140. The cladding 136 may be connected to the header 132, and the jambs 134 by a key arranged to engage a keyway. The key and the keyway allow the cladding 136 to move relative to the header 132, and the jambs 134. As a result, the key and the keyway enable the cladding 136 to be a different material than the header 132, and the jambs 134.

In addition, in this embodiment, the external frame 106 and the interior cladding 136 are designed to prevent the cladding 136 from coming into contact with moisture that could infiltrate the door 100 from the exterior. For example, the door 100 may include a cavity 147 extending from the first side 120 to the second side 122 when the door is in a closed position and structurally separating the external frame 106 and the interior cladding 136. Openings 149 may be defined in the sill 130 and/or the jambs 134 and allow moisture to exit the cavity 147. The openings 149 are positioned to inhibit moisture moving to the second side 122 from the first side 120. Specifically, the opening 149 on the first side 120 is positioned on a lower portion of the cavity 147. The opening 149 on the second side 122 is positioned on an upper side of the cavity 147. Accordingly, the frame 106 is configured to prevent damage to the cladding 136 from moisture intruding through the door 100. In other embodiments, the door 100 may include any cavity that enables the door to function as described.

In this embodiment, weatherstripping 148 may be positioned along the door opening. In some embodiments, the weatherstripping 148 may include an inner strip and an outer strip extending along the opening on opposite sides of the door 100. Accordingly, the weatherstripping 148 may inhibit moisture and/or wind penetrating around the door and flowing to the interior when the door 100 is in a closed position. In addition, the weatherstripping 148 dampen the transmission of sound waves through the door 100.

The frame 106 may include one or more thermal seals 151. For example, the thermal seals 151 may be connected to the frame 106, the insulated glass unit 102, the top rail 125, the bottom rail 126, and the stiles 127. The thermal seals 151 extend through the cavity 147 and inhibit thermal transfer through the cavity. In other embodiments, the frame 106 may include any seals that enable the frame 106 to function as described.

The frame 106 may include any suitable materials. For example, in this embodiment, the jambs 134 include a first material such as aluminum. The cladding 136 includes a second material such as wood. Accordingly, the frame 106 includes at least two different materials. In other embodiments, the frame 106 may include any material such as, for example and without limitation, metal, wood, vinyl, and fiberglass.

Also, in this embodiment, the door 100 includes panel cladding 156. The panel cladding 156 includes the second material and is connected to the top rail 125, the bottom rail 126, and the stiles 127 by a key and a keyway. In other embodiments, the door 100 includes any panel cladding that enables the door to function as described.

In the illustrated embodiment, the first material is visible on a first side 120 of the door 100 and the second material is visible on a second side 122 of the door. The different materials provide different characteristics for the door 100. For example, the first material may increase the strength of the door 100 and the second material may provide a desired appearance for the door. In this embodiment, the door 100 is positioned on a structure such that the second side 122 is on the interior and the first side 120 is on the exterior of the structure. Accordingly, the first material is visible on the exterior and the second material is visible on the interior of the structure.

In reference to FIG. 4, the frame 106 further defines a frame thermal break 128 intermediate the first side 120 and the second side 122. The frame thermal break 128 has a width in a range of about 1 inch (in.) to about 2 in. The frame thermal break 128 is aligned with the pocket 112 such that the central plane 114 extends through a middle portion of the frame thermal break 128. For example, in some embodiments, a distance 135 between a central plane 133 of the frame thermal break 128 and the central plane 114 of the pocket 112 is in a range up to about 0.75 in. In this embodiment, the distance between the central plane 133 and the central plane 114 is less than about 0.5 in. Accordingly, the frame thermal break 128 and the pocket 112 provide a substantially continuous thermal break extending through the door 100 to reduce the transfer of heat through the door. In other embodiments, the door 100 may have any frame thermal break 128 that enables the door to operate as described.

In addition, the top rail 125, the bottom rail 126, and the stiles 127 define a panel thermal break 150 intermediate the first side 120 and the second side 122. The panel thermal break 150 is aligned with the pocket 112 such that the central plane 114 extends through the panel thermal break when the door is in a closed position. For example, in some embodiments, a distance between a central plane of the thermal break 150 and the central plane 114 of the pocket 112 is in a range up to about 0.75 in. In this embodiment, the panel thermal break 150 and the pocket 112 have a common central plane 114 when the door is in a closed position. In other embodiments, the door 100 may include any thermal break that enables the door to function as described. For example, in some embodiments, the top rail 125, the bottom rail 126, and the stiles 127 do not necessarily include a thermal break 150. In further embodiments, the door 100 includes three or more thermal breaks.

An insulating material having a thermal conductance less than the first material and/or the second material may be positioned within the frame thermal break 128 and the panel thermal break 150. For example, the insulating material may have a thermal conductance in a range of about 0.21 British thermal units per hour square feet degrees Fahrenheit (Btu/(hr·ft$^{2}$·° F.)) to about 0.840 Btu/(hr·ft$^{2}$·° F.). The insulating material substantially fills the frame thermal break 128 and extends between portions of the frame 106 including the first material and/or the second material to reduce heat transfer through the door. In other embodiments, the door 100 may include any insulating material that enables the door to operate as described.

In reference to FIGS. 1-5, a method 200 of assembling the door 100 includes aligning 226 the frame thermal break 128 and the pocket 112 such that the central plane 114 of the pocket extends through the frame thermal break. Accordingly, the frame thermal break 128 and the pocket 112 provide a continuous thermal break through the door 100 to inhibit heat transfer through the door. In some embodiments, extrusions for the frame 106 are designed to provide alignment of the frame thermal break 128 and the pocket 112. In other embodiments, the frame thermal break 128 and the pocket 112 may be aligned in any manner that enables the door 100 to operate as described.

Also, the method includes positioning 201 insulating material in the frame thermal break 128 defined by the frame 106 intermediate the first side 120 and the second side 122. In addition, the method includes fabricating 202 components for the frame 106, the face 140, and the cap 142. For example, the sill 130, the header 132, and the jambs 134 may be cut for the frame 106 from a material such as aluminum. In addition, the sill 130, the header 132, and/or the jambs 134 may be cut for the face 140 and the cap 142 of the cladding 136 from a material such as wood. In other embodiments, the frame 106 may be fabricated in any manner that enables the frame to function as described. In some embodiments, components such as the cap 142 may be omitted.

The frame 106 may be assembled by positioning 204 each corner key 138 into the opening 145 in one of the header 132 and the sill 130 and into the opening 145 in one of the jambs 134 to form corners of the frame. In some embodiments, the header 132, the sill 130, and/or the jambs 134 are connected using fasteners in addition to or in place of the corner keys 138. With the corner keys 138 and/or fasteners maintaining the frame 106 in position, the sill 130, the header 132, and the jambs 134 may be connected 208 at the corners and installed in a wall of a structure.

After the frame 106 is assembled, the door 100 may be prepared for glazing. For example, sealant may be applied to the frame 106 and the insulated glass unit 102 may be positioned on the frame 106. Stops may be positioned on the frame 106 to secure the insulated glass unit 102 and the door 100 may be prepared for cladding. In other embodiments, the insulated glass unit 102 may be secured to the frame 106 in any suitable manner.

To assemble doors 100 that are operable (i.e., positionable between opened and closed positions), the insulated glass unit 102 may be supported by the panel frame 124 that is moveably positioned in the frame 106. For example, hardware and seals are attached 228 to the frame 106. The panel frame 124 is positioned 229 in the frame 106. The panel frame 124 may be positioned such that it is movable, e.g., pivotable and/or slidable, relative to the frame 106. In some embodiments, the insulated glass unit 102 is secured in the panel frame 124 prior to connecting the insulated glass unit 102 to the frame 106. For example, the door 100 is conveyed 230 into a glazing station and the insulated glass unit 102 is positioned 232 in the panel frame 124. In some embodiments, setting block chairs may be positioned on the panel frame 124 and used to support the insulated glass unit 102 in the panel frame 124. The door 100 is conveyed 234 out of the glazing station and glazing stops are fabricated 236 and positioned 238 on the door 100. In some embodiments, some of the glass panes of the door 100 may be fixed. For the fixed glass panes, the panel frame 124 may be positioned and secured such that the position of the glass pane is fixed relative to the frame 124.

In some embodiments, the panels are assembled at an assembly site and shipped to the installation site where the frame 106 is assembled. Accordingly, the panels may be positioned in the frame 106 at the installation site. For example, at least some sliding glass panels are assembled at an assembly site and positioned in frames 106 that are assembled at a remote installation site.

In addition, the method 200 includes positioning 206 the cladding face 140 on the header 132 and the jambs 134 and connecting 210 the cladding face 140 to the frame 106. In some embodiments, the cladding face 140 may be secured to the header 132 and the jambs 134 at the same time that the header 132 and the jambs 134 are secured together. In other embodiments, the header 132 and the jambs 134 are secured together at an assembly site and the cladding face 140 and any other trim or extension jambs may be connected to the door 100 at an installation site.

The cladding face 140 may be secured using nails. The corners of the frame 106 may be sealed, for example, by at least partially filling the openings 145 with sealant if the corner keys are used. In addition, any seams in the corners may be sealed. Alternatively or in addition, molded gaskets may be used to seal the frame 106. The cap 142 may be connected 215 to the face 140 after the face is connected to the frame 106. For example, the frame 106 may be conveyed into a nailer station and the cap 142 nailed to the face 140. In other embodiments, the cap 142 and the face 140 are provided as a single piece. After connecting 215 the face 140, the frame 106 may be prepared for hardware attachment.

In some embodiments, the frame 106 is mounted in a wall of a structure such that first side 120 is positioned on the exterior of the structure and the second side 122 is positioned on the interior of the structure. Accordingly, the cladding 136 may be connected to the second side 122 of the door such that the cladding 136 is visible on the interior of the structure. In other embodiments, the cladding 136 may be connected to the sill 130, the header 132, and/or the jambs 134 in any manner that enables the door 100 to operate as described.

In other embodiments, the frame 106 may be assembled in any suitable manner using, for example and without limitation, adhesives, fasteners, and/or any other suitable attachment means.

The steps of the method illustrated and described herein are in a specific order that provides advantages for the described embodiments. In other embodiments, the method may be performed in any order and the embodiments may include additional or fewer operations than those described herein. For example, it is contemplated that executing or performing a particular operation before, contemporaneously with, or after another operation is within the scope of some aspects of the description.

Figure 6:
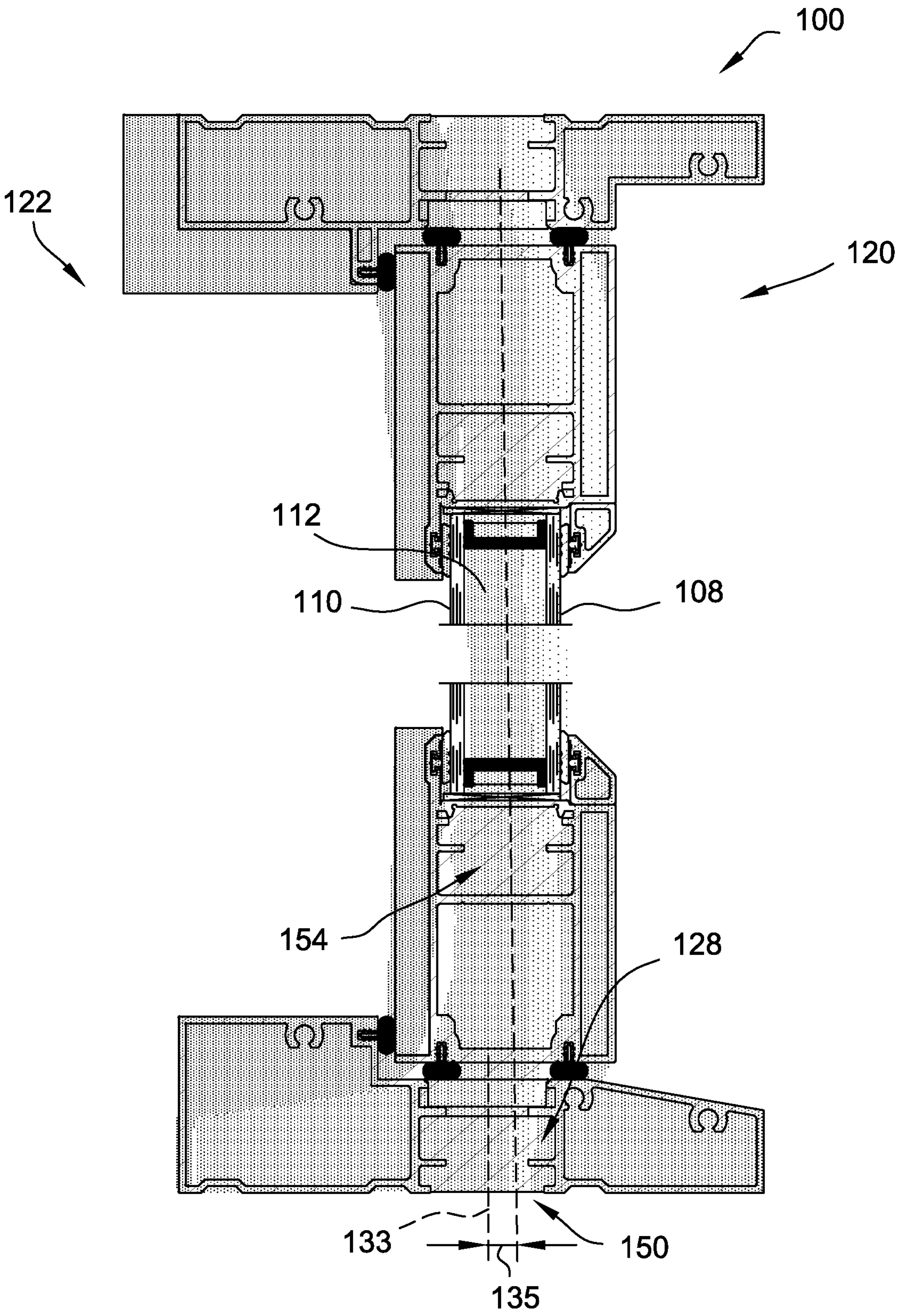
FIG. 6 is a schematic sectional view showing temperature zones of the door shown in FIG. 1, taken along section line B-B.

FIG. 6 is a sectional view showing temperature zones of the door 100. For example, the door 100 may be positioned in the wall of a structure such that the first side 120 is on an exterior of the structure and the second side 122 is on an interior of the structure. In the illustrated embodiment, the first side 120 has a first temperature and the second side 122 has a second temperature. In this embodiment, the second temperature is greater than the first temperature because the interior of the structure is warmer than the exterior. Accordingly, heat has a tendency to flow from the interior of the structure towards the exterior. In other embodiments, the exterior may be warmer than the interior.

As shown in FIG. 6, the frame thermal break 128, the panel thermal break 150, and the pocket 112 define a substantially continuous thermal break 154 extending through the door 100. The thermal break 154 interrupts the transfer of heat from the first side 120 to the second side 122. Accordingly, the second side 122 is able to have a temperature that is significantly less than the temperature of the first side 120. As a result, the door 100 reduces the transfer of heat between the exterior and the interior of structure.

Figure 7:
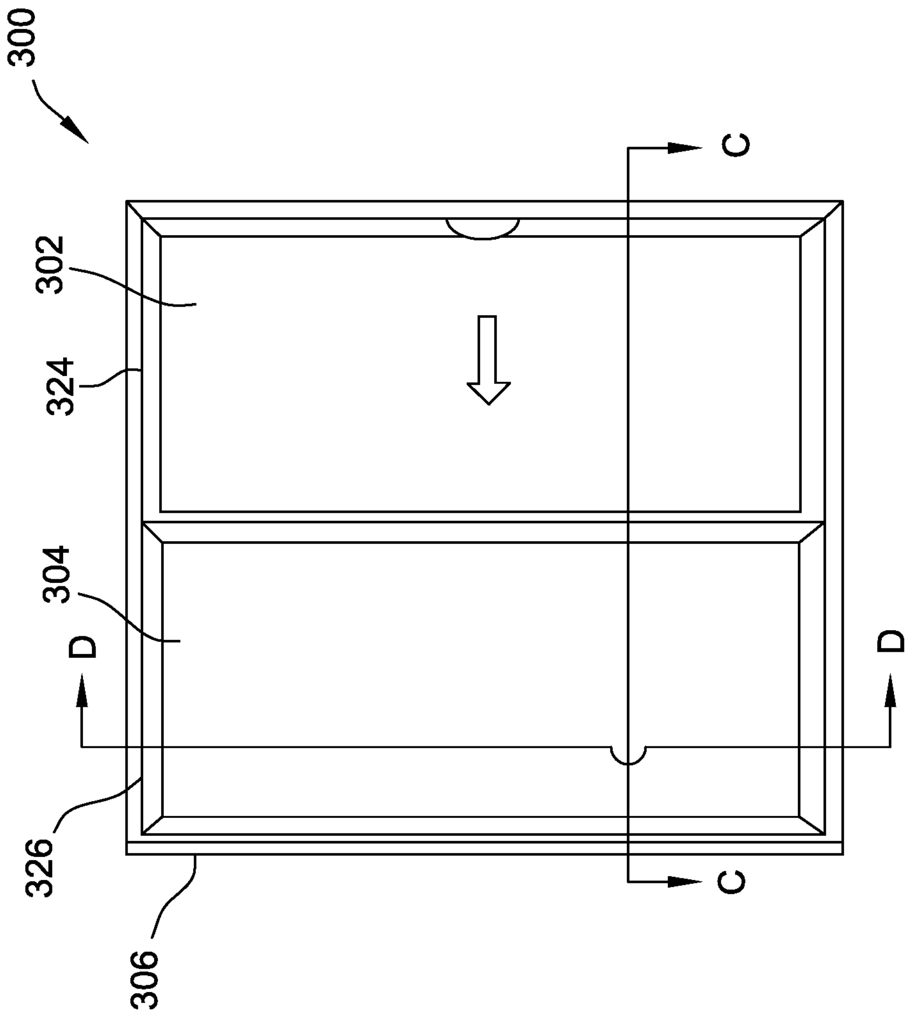
FIG. 7 is an elevation view of an example door including at least one sliding panel.
Figure 8:
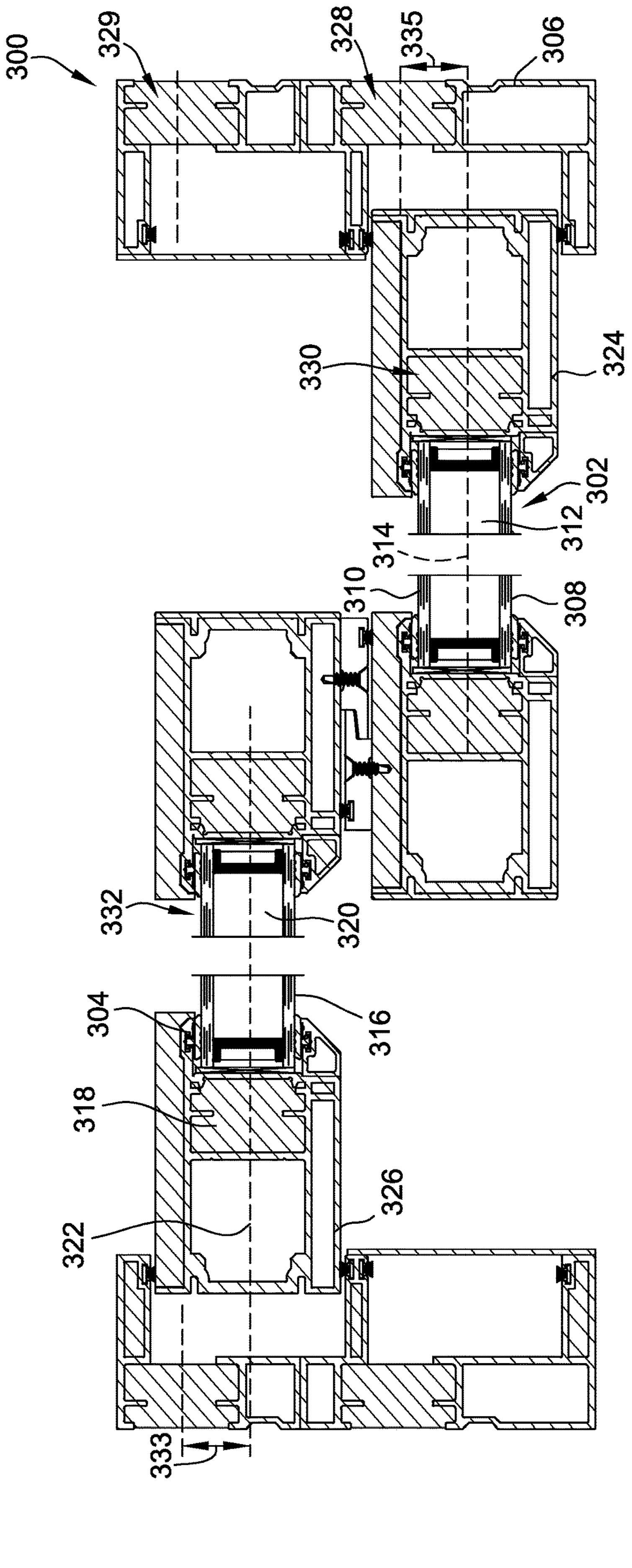
FIG. 8 is a sectional foreshortened view of a portion of the door shown in FIG. 7, taken along section line C-C.
Figure 9:
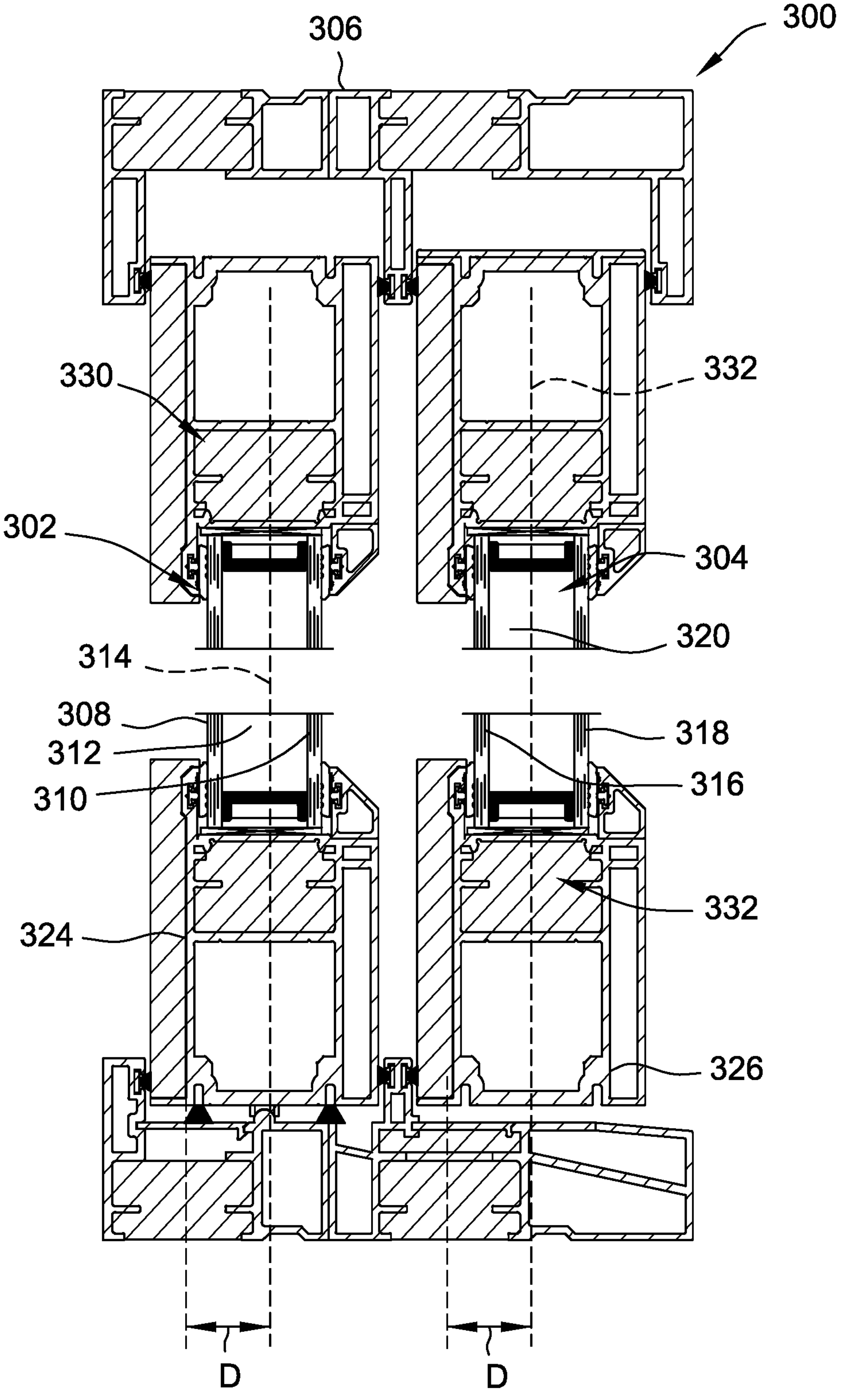
FIG. 9 is a sectional foreshortened view of a portion of the door shown in FIG. 7, taken along section line D-D.

In reference to FIGS. 7-9, a door 300 includes a first insulated glass unit 302, a second insulated glass unit 304, and a frame 306. The first insulated glass unit 302 includes a first glass pane 308 and a second glass pane 310. The second glass pane 310 is spaced from the first glass pane 308 such that the first glass pane and the second glass pane define a pocket 312 therebetween. A central plane 314 extends through the pocket 312 and is spaced equal distances from the first glass pane 308 and the second glass pane 310. The second insulated glass unit 304 includes a third glass pane 316 and a fourth glass pane 318. The fourth glass pane 318 is spaced from the third glass pane 316 such that the third glass pane and the fourth glass pane define a pocket 320 therebetween. A central plane 322 extends through the pocket 320 and is spaced equal distances from the third glass pane 316 and the fourth glass pane 318. The pockets 312, 320 may be filled with a gas such as argon to reduce the transfer of heat through the door 300. In other embodiments, the door 300 may include any insulated glass unit that enables the door to function as described.

In addition, the door 300 includes a first panel frame 324 and a second panel frame 326. The first panel frame 324 circumscribes the first insulated glass unit 302 and the second panel frame 326 circumscribes the second insulated glass unit 304. In the example, the first insulated glass unit

302 and the first panel frame 324 form a first panel and the second insulated glass unit 304 and the second panel frame 326 form a second panel. In other embodiments, the door 300 may include any panels that enable the door to function as described.

In this embodiment, at least the first panel frame 324 and the first insulated glass unit 302 is configured to slide relative to the frame 106. The central plane 314 of the first insulated glass unit 302 is offset from the central plane 322 of the second insulated glass unit 304 to enable at least one of the first panel and the second panel to move relative to the other. Accordingly, the door 300 is a sliding door. In other embodiments, the door 300 may have any panels that enable the door 300 to function as described. For example, in some embodiments, the central plane 314 of the first insulated glass unit 302 and the central plane 322 of the second insulated glass unit 304 may be unaligned and extend at an angle relative to each other when at least one of the first panel and the second panel is in an opened position. In further embodiments, the first panel frame 324 and/or the second panel frame 326 may be omitted and the first insulated glass unit 302 and/or the second insulated glass unit 304 may be fixed relative to the frame 306.

The door 300 includes at least one thermal break extending between first and second sides of the frame and generally circumscribing the first insulated glass unit 302 and the second insulated glass unit 304. Specifically, the frame 306 includes a first frame thermal break 328 and a second frame thermal break 329. The first insulated glass unit 302 and the first frame thermal break 328 are positioned such that a distance 333 between the central plane 314 and a central plane of the first frame thermal break 328 is less than about 0.75 in. The second insulated glass unit 304 and the second frame thermal break 329 are positioned such that a distance 335 between the central plane 322 and a central plane of the second frame thermal break 329 is less than about 0.75 in. The first panel frame 324 includes a first panel thermal break 330 and the second panel frame 326 includes a second panel thermal break 332. The first insulated glass unit 302 and the first panel thermal break 330 are positioned such that the central plane 314 extends through the first panel thermal break 330. The second insulated glass unit 304 and the second panel thermal break 332 are positioned such that the central plane 322 extends through the second panel thermal break 332. Accordingly, the first insulated glass unit 302, the second insulated glass unit 304, and the thermal breaks 328, 329, 330, 332 provide at least one continuous thermal break extending through the door 300.

Figure 10:
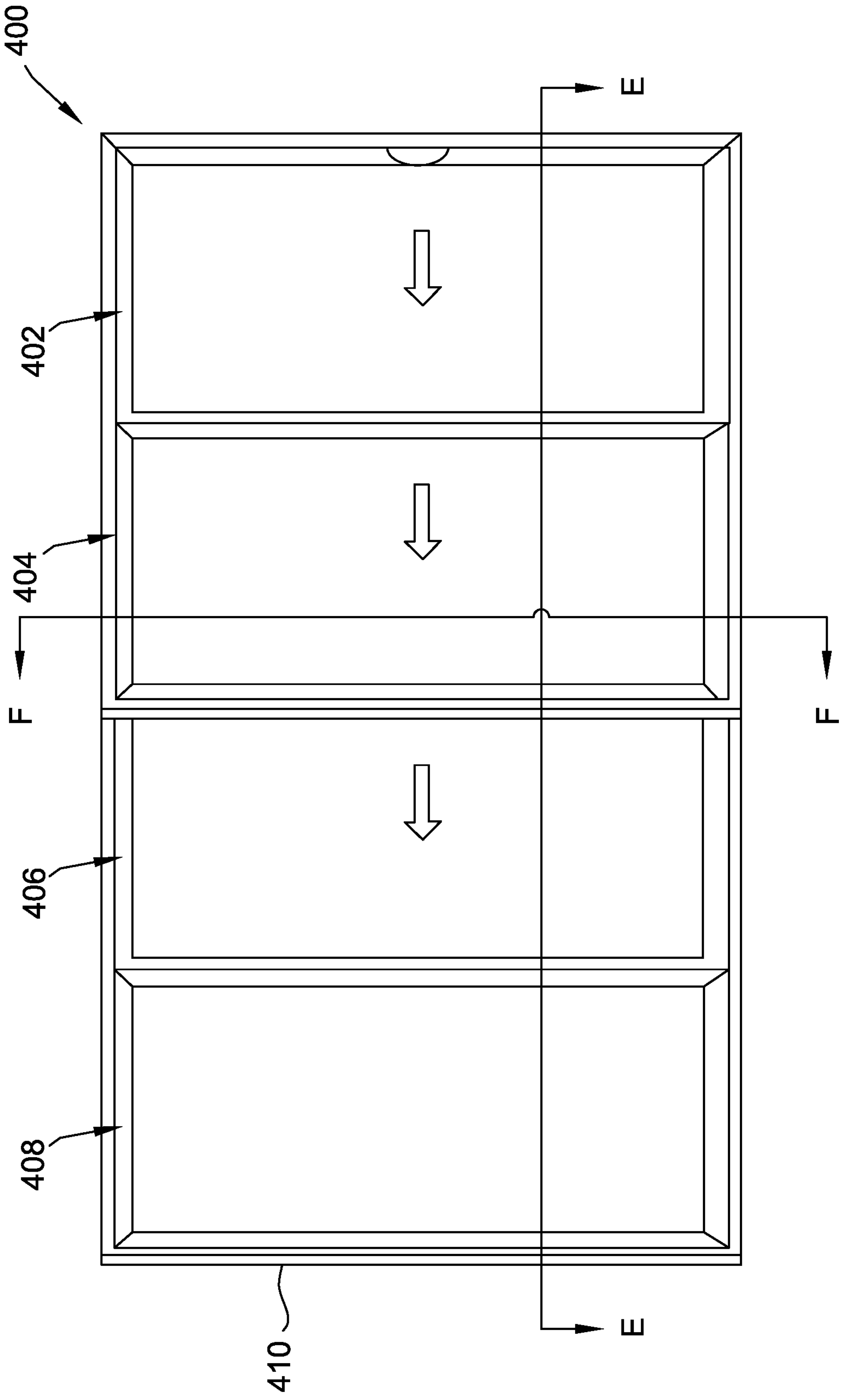
FIG. 10 is an elevation view of an example door including multiple sliding panels.
Figure 11:
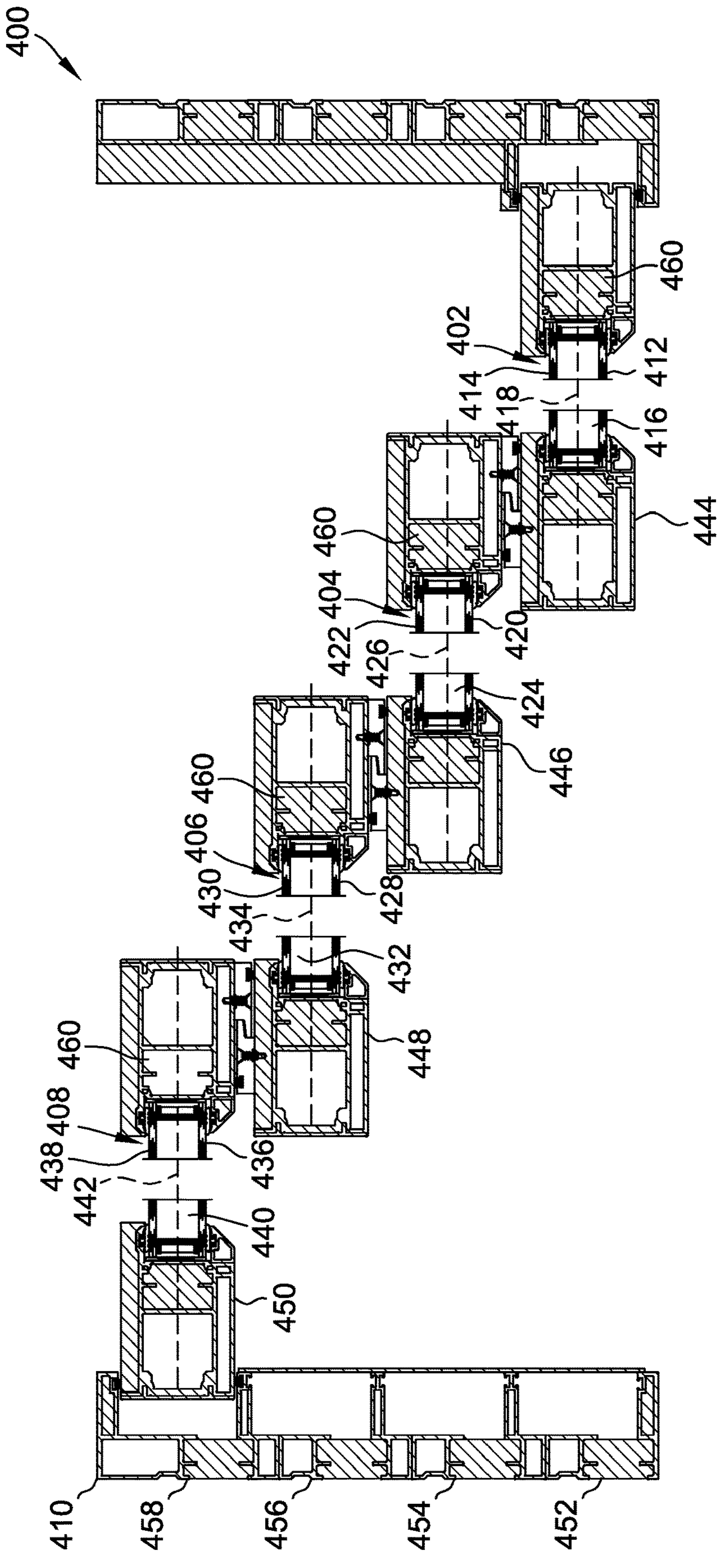
FIG. 11 is a sectional foreshortened view of a portion of the door shown in FIG. 10, taken along section line E-E.
Figure 12:
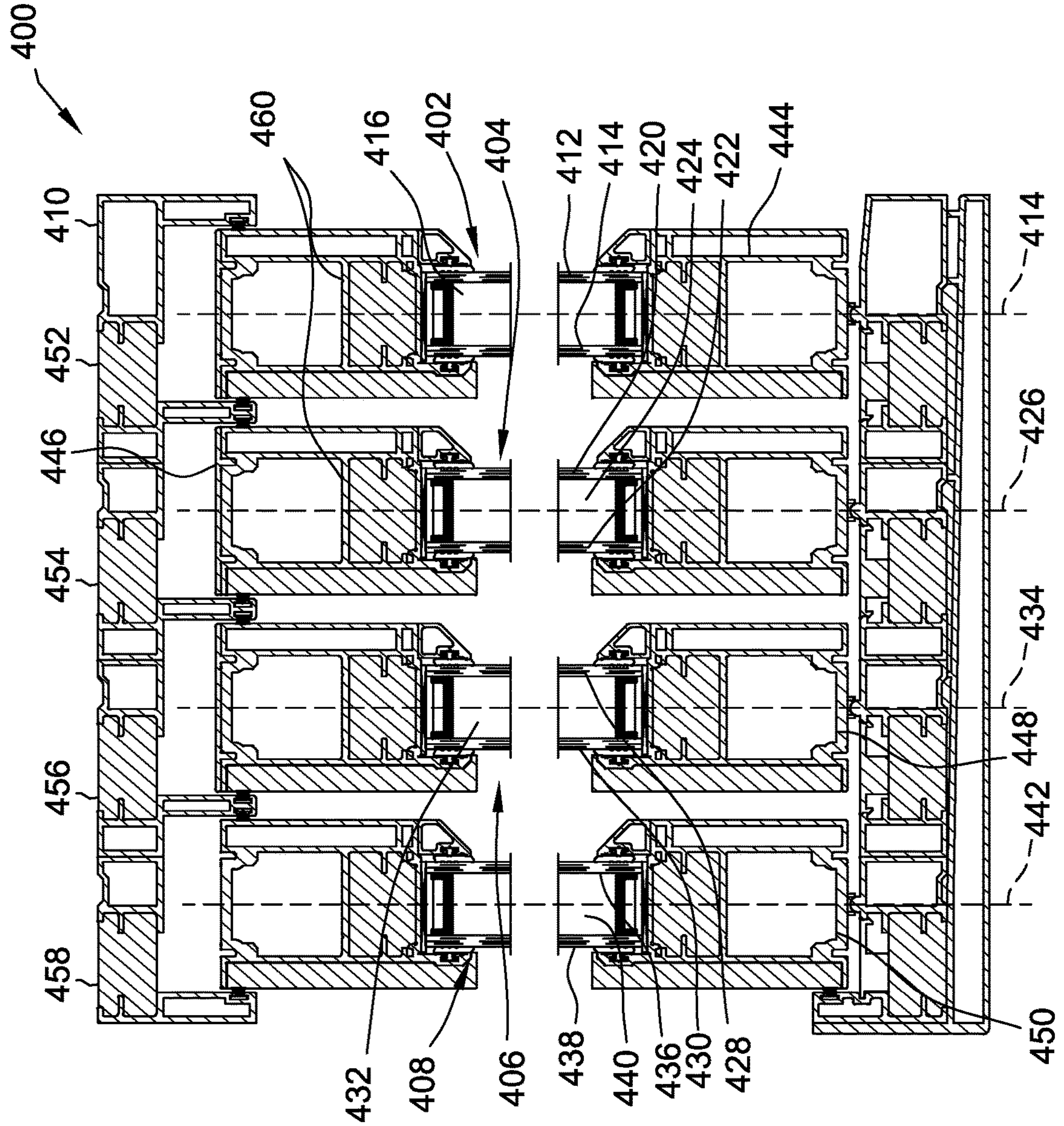
FIG. 12 is a sectional foreshortened view of a portion of the door shown in FIG. 10, taken along section line F-F.

In reference to FIGS. 10-12, a door 400 includes a first insulated glass unit 402, a second insulated glass unit 404, a third insulated glass unit 406, a fourth insulated glass unit 408, and a frame 410. The first insulated glass unit 402 includes a first glass pane 412 and a second glass pane 414. The second glass pane 414 is spaced from the first glass pane 412 such that the first glass pane and the second glass pane define a pocket 416 therebetween.

A central plane 418 extends through the pocket 416 and is spaced equal distances from the first glass pane 412 and the second glass pane 414. The second insulated glass unit 404 includes a third glass pane 420 and a fourth glass pane 422. The fourth glass pane 422 is spaced from the third glass pane 420 such that the third glass pane and the fourth glass pane define a pocket 424 therebetween.

A central plane 426 extends through the pocket 424 and is spaced equal distances from the third glass pane 420 and the fourth glass pane 422. The third insulated glass unit 406 includes a fifth glass pane 428 and a sixth glass pane 430. The sixth glass pane 430 is spaced from the fifth glass pane 428 such that the fifth glass pane and the sixth glass pane define a pocket 432 therebetween.

A central plane 434 extends through the pocket 432 and is spaced equal distances from the fifth glass pane 428 and the sixth glass pane 430. The fourth insulated glass unit 408 includes a seventh glass pane 436 and an eighth glass pane 438. The eighth glass pane 438 is spaced from the seventh glass pane 436 such that the seventh glass pane and the eighth glass pane define a pocket 440 therebetween. A central plane 442 extends through the pocket 440 and is spaced equal distances from the seventh glass pane 436 and the eighth glass pane 438. The pockets 416, 424, 432, 440 may be filled with a gas such as argon to reduce the transfer of heat through the door 400. In other embodiments, the door 400 may include any insulated glass unit that enables the door to function as described.

In addition, the door 400 includes a first panel frame 444, a second panel frame 446, a third panel frame 448, and a fourth panel frame 450. The first panel frame 444 circumscribes the first insulated glass unit 402. The second panel frame 446 circumscribes the second insulated glass unit 404. The third panel frame 448 circumscribes the third insulated glass unit 406. The fourth panel frame 450 circumscribes the fourth insulated glass unit 408. In this embodiment, the first panel frame 444, the second panel frame 446, the third panel frame 448, and the fourth panel frame 450 are configured to slide relative to the frame 106. The central planes 418, 426, 434, 442 are offset from each other to enable the first panel frame 444, the second panel frame 446, the third panel frame 448, and the fourth panel frame 450 to move relative to each other. As shown and described, the door 400 of this embodiment is a sliding door, but in other embodiments, the door 400 may have any number of panels, and other configurations, that enable the door 300 to function as described.

The door 400 includes at least one thermal break extending between first and second sides of the frame and generally circumscribing the first insulated glass unit 402, the second insulated glass unit 404, the third insulated glass unit 406, and the fourth insulated glass unit 408. Specifically, the frame 410 includes a first frame thermal break 452, a second frame thermal break 454, a third frame thermal break 456, and a fourth frame thermal break 458.

The first insulated glass unit 402, the second insulated glass unit 404, the third insulated glass unit 406, the fourth insulated glass unit 408, and the thermal breaks 452, 454, 456, 458 are positioned such that a distance between each of the central planes 418, 426, 434, 442 and a central plane of at least one of the thermal breaks 452, 454, 456, 458 is less than about 0.75 in.

The first panel frame 444, the second panel frame 446, the third panel frame 448, and the fourth panel frame 450 each include a panel thermal break 460. The first insulated glass unit 402, the second insulated glass unit 404, the third insulated glass unit 406, the fourth insulated glass unit 408, and the thermal breaks 460 are positioned such that each central plane 418, 426, 434, 442 extends through the thermal break 460 of the respective panel frame 444, 446, 448, 450. Accordingly, the first insulated glass unit 402, the second insulated glass unit 404, the third insulated glass unit 406, the fourth insulated glass unit 408, and the thermal breaks 452, 454, 456, 458, 460 provide a continuous thermal break extending through the door 400.

Figure 13:
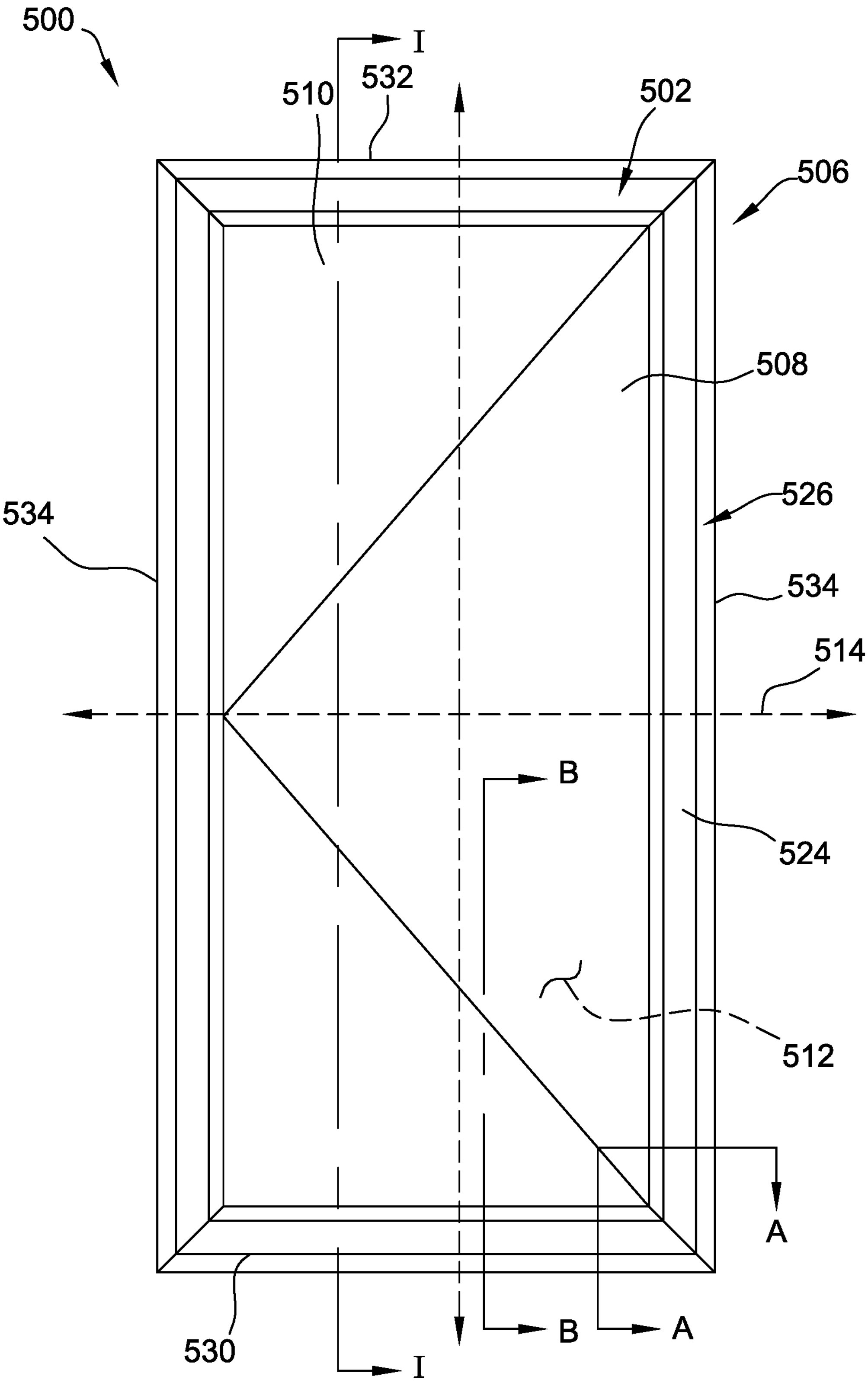
FIG. 13 is an elevation view of an example window.
Figure 14:
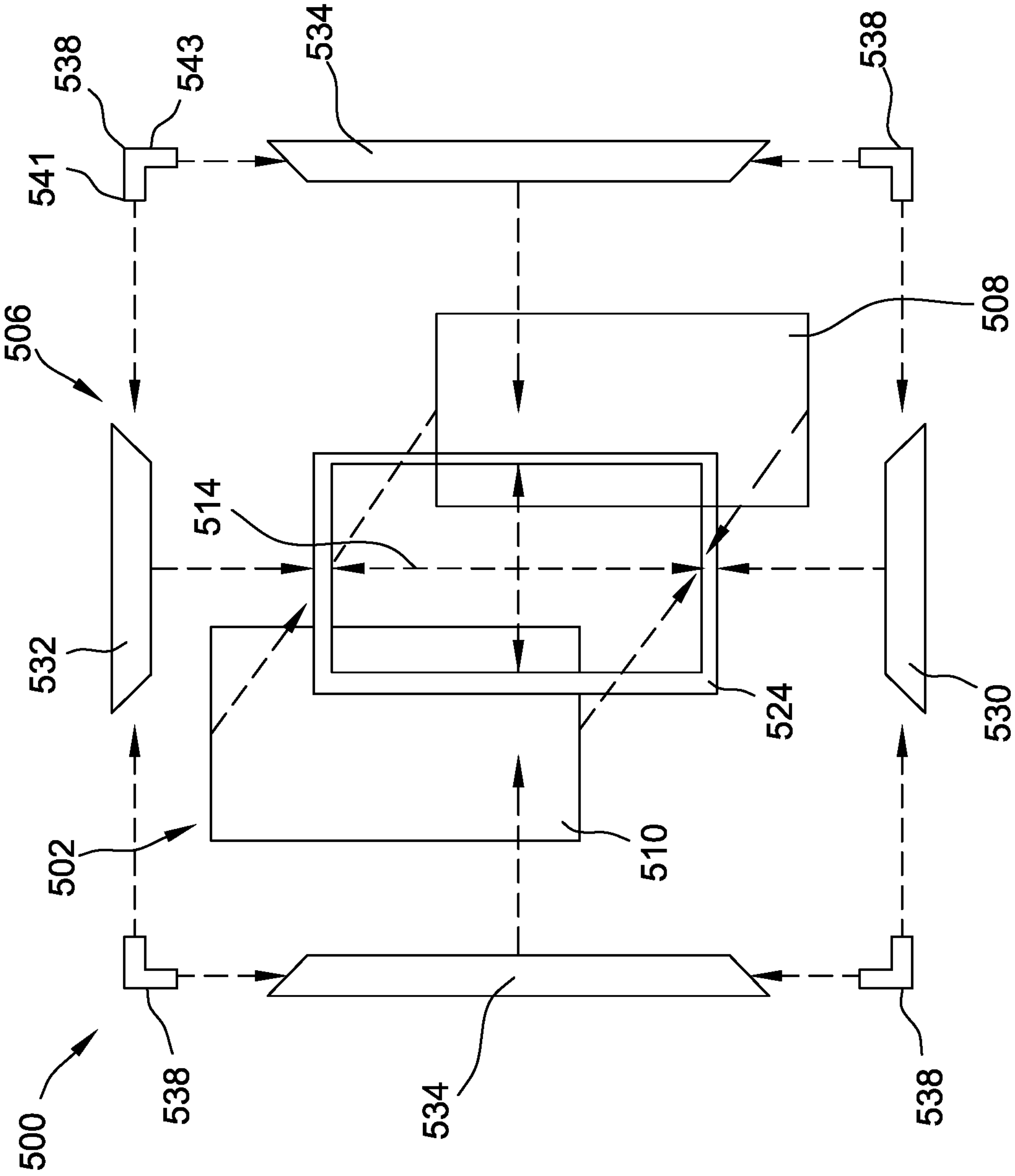
FIG. 14 is an exploded assembly view of the window shown in FIG. 13.

FIG. 13 is an elevation view of an example window 500. FIG. 14 is an exploded assembly view of the window 500. The window 500 includes an insulated glass unit 502 and a frame 506. The insulated glass unit 502 includes a first glass pane 508 and a second glass pane 510. The second glass pane 510 is spaced from the first glass pane 508 such that the first glass pane and the second glass pane define a pocket 512 therebetween. A central plane 514 extends through the pocket 512 and is spaced equal distances from the first glass pane 508 and the second glass pane 510. The pocket 512 may be filled with an insulating material such as argon gas. In other embodiments, the window 500 may include any insulated glass unit 502 that enables the window to function as described. For example, in some embodiments, a third glass pane may be disposed between the first glass pane 508 and the second glass pane 510 and generally aligned with the central plane 514.

In addition, the window 500 includes a sash frame 524. The sash frame 524 circumscribes the insulated glass unit 502. For example, the insulated glass unit 502 may be secured in the sash frame 524 by a glazing stop 507 (shown in FIG. 20). In the example, the insulated glass unit 502 and the sash frame 524 form a sash 526 of the window 500. The sash 526 may be connected to the frame 506 such that the insulated glass unit 502 and the sash frame 524 are positionable relative to the frame 506. For example, in some embodiments, the sash frame 524 and the insulated glass unit 502 may be pivotable and/or slidable relative to the frame 506. In other embodiments, the first insulated glass unit 502 and the sash frame 524 may be positioned in the frame 506 in any manner that enables the window 500 to operate as described. For example, in some embodiments, the window includes two or more sashes 526 that are movable relative to the frame 506. In further embodiments, the sash frame 524 may be omitted and the insulated glass unit 502 may be fixed to the frame 506.

In reference to FIG. 14, the frame 506 includes a sill 530, a header 532, jambs 534, cladding 536 (shown in FIGS. 16 and 17), and corner keys 538. In the example, the sill 530 and the header 532 extend horizontally and define a width of the window 500. The jambs 534 extend vertically and define a height of the window 500. Together the sill 530, the header 532 and the jambs 534 are configured to circumscribe and support the first glass pane 508 and the second glass pane 510. In the illustrated embodiment, the frame 506 is rectangular. In other embodiments, the window 500 may include any frame 506 that enables the window to function as described.

Figure 15:
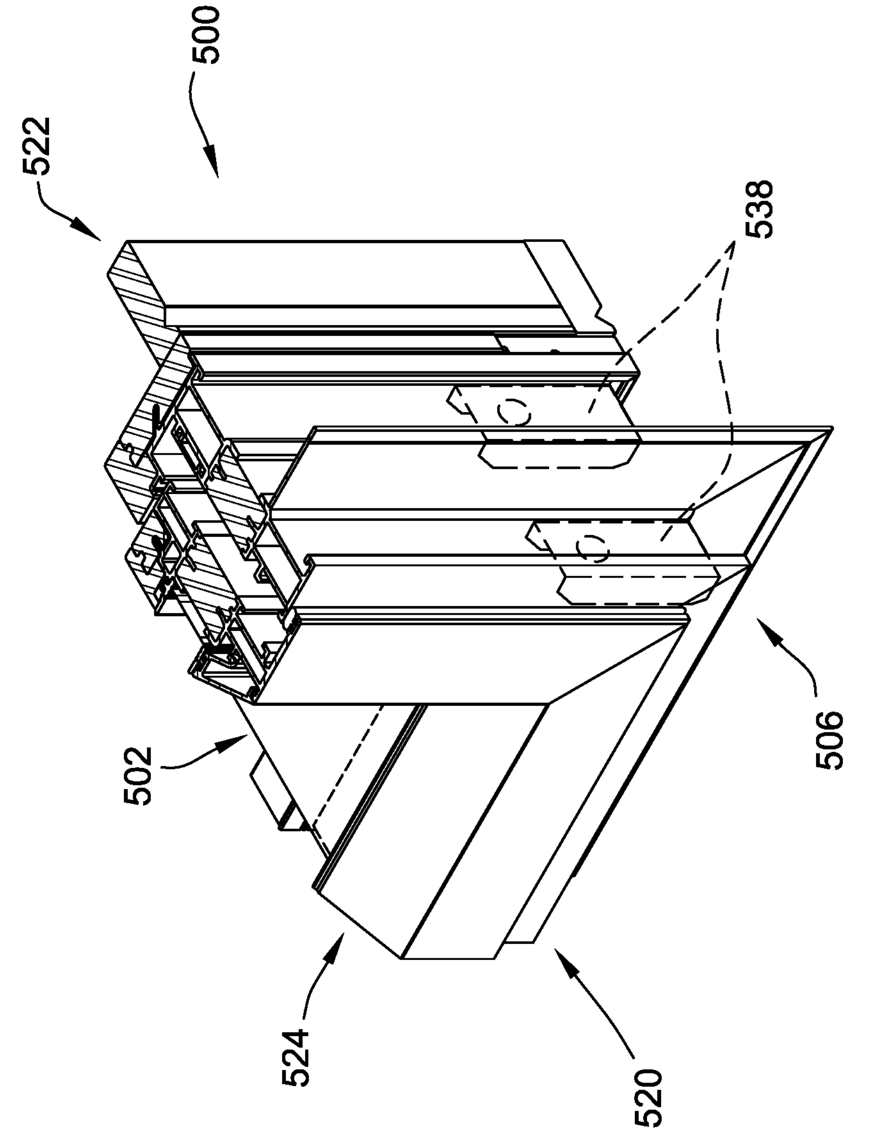
FIG. 15 is an enlarged perspective view of the window shown in FIG. 13 with a portion removed to show corner keys, the window being cut away along section line G-G.
Figure 16:
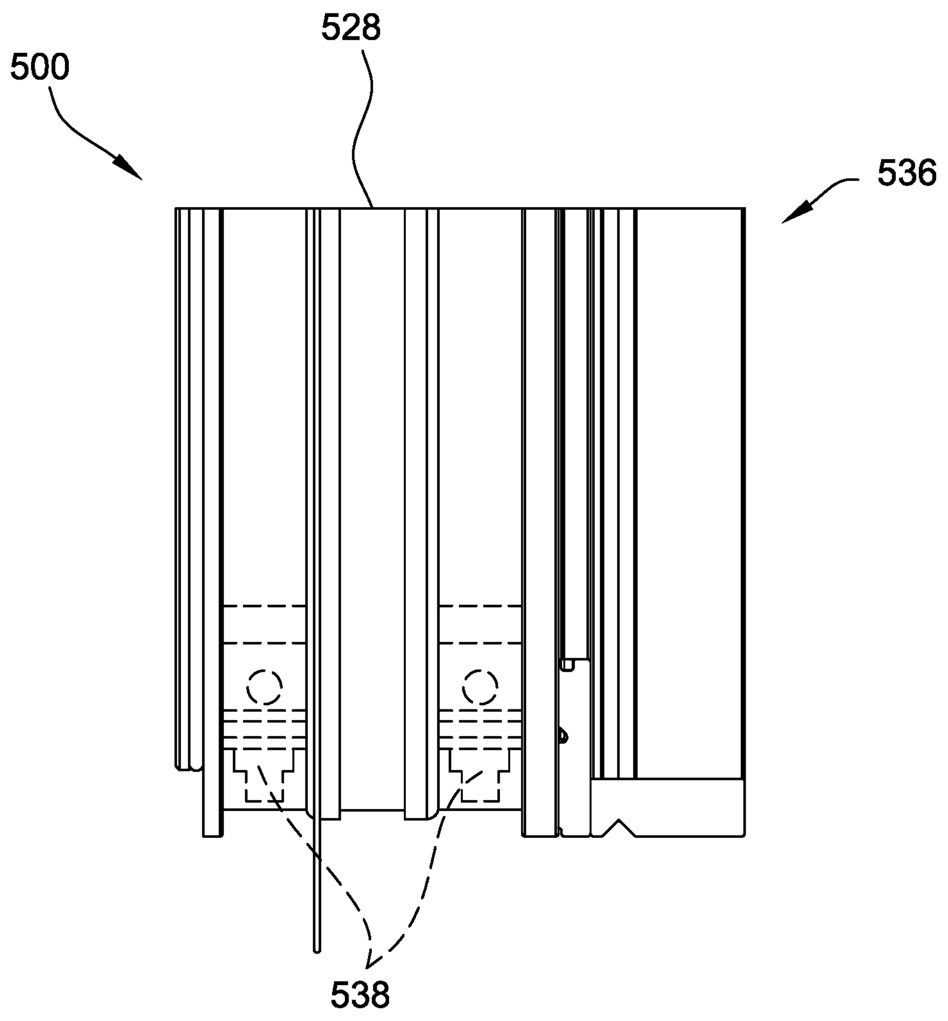
FIG. 16 is an enlarged side view of a portion of the window shown in FIG. 13, the window being cut away along section line G-G.
Figure 17:
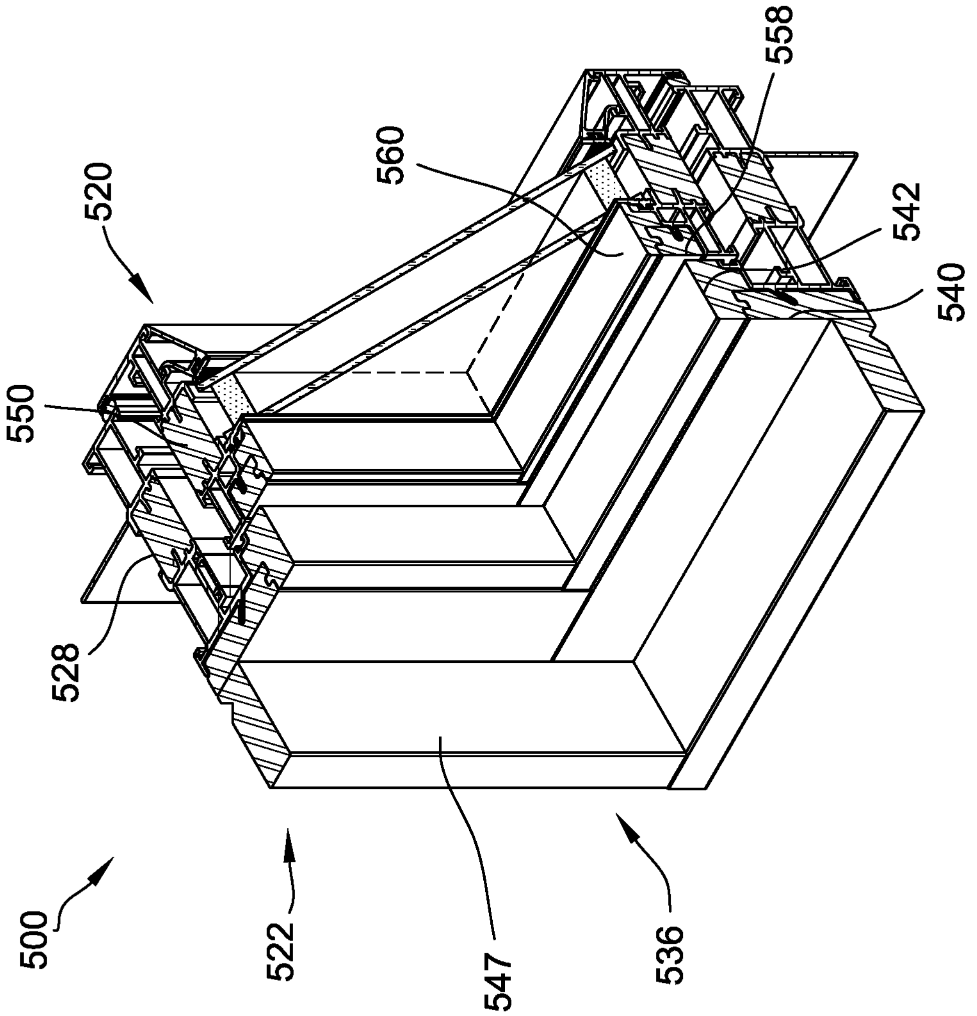
FIG. 17 is an enlarged perspective view of a portion of the window shown in FIG. 13, the window being cut away along section line G-G.

In reference to FIGS. 14-16, each corner key 538 is sized and shaped to extend into openings 545 in the sill 530, the header 532, and the jambs 534. In addition, the corner keys 538 are shaped to connect the sill 530, the header 532, and the jambs 534 such that the sill, the header and the jambs extend at angles relative to each other. For example, in the illustrated embodiment, each corner key 538 defines a right angle. In other embodiments, the frame 506 may include any corner keys 538 that enable the window 500 to function as described.

Figure 20:
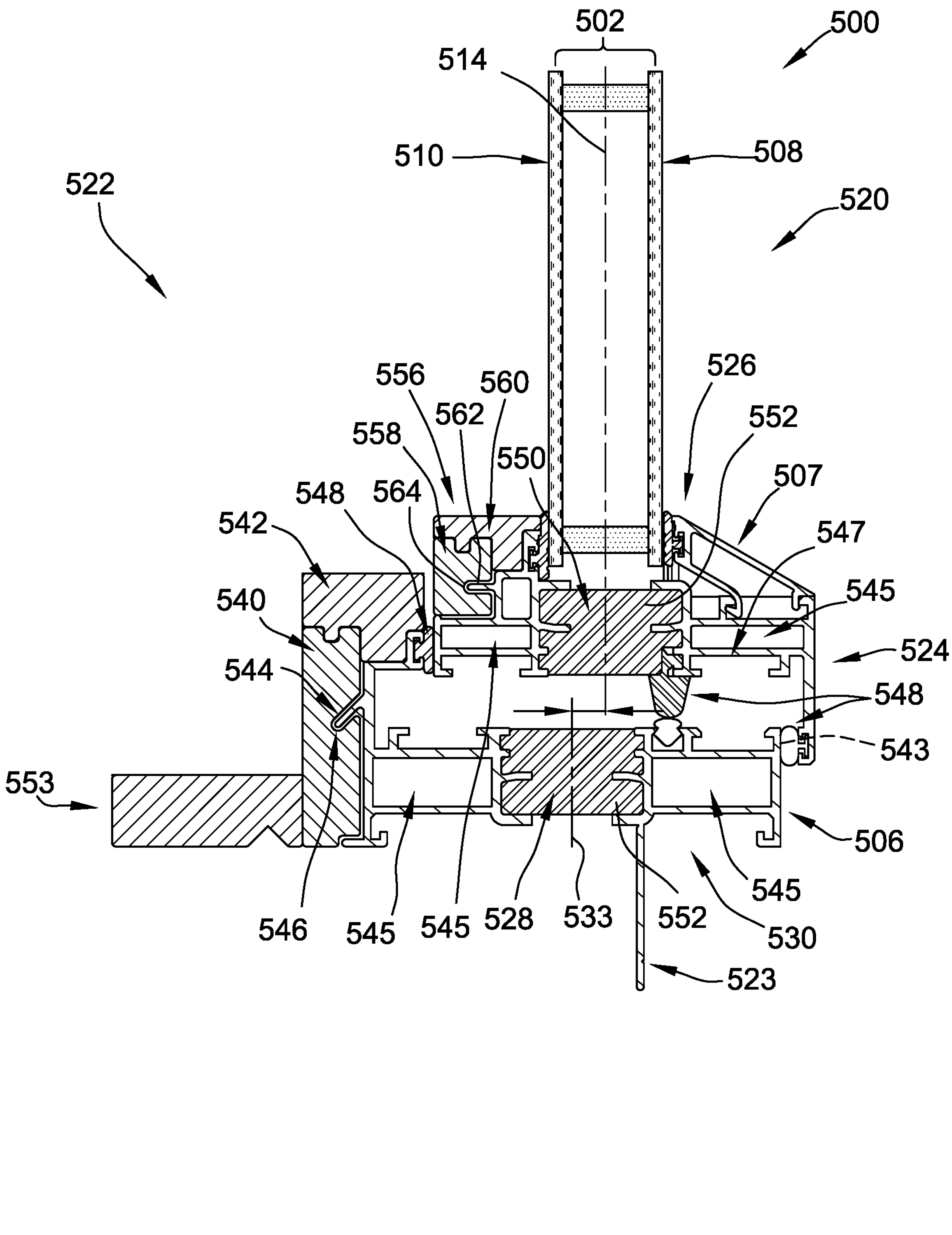
FIG. 20 is a sectional view of a portion of the window shown in FIG. 13, taken along section line H-H.
Figure 21A:
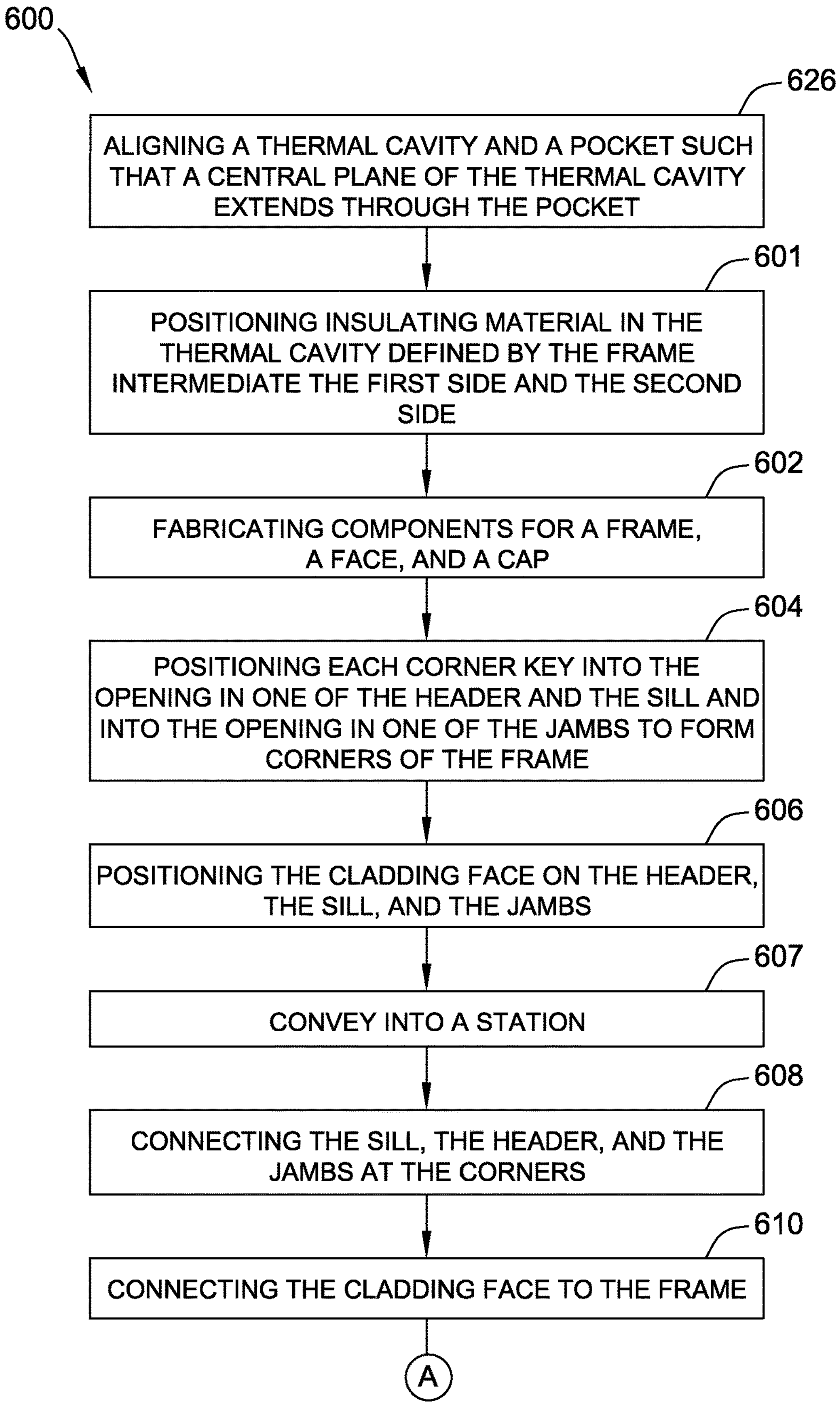
FIGS. 21A-D depict a flow chart of an example method of assembling the window shown in FIG. 13.
Figure 21B:
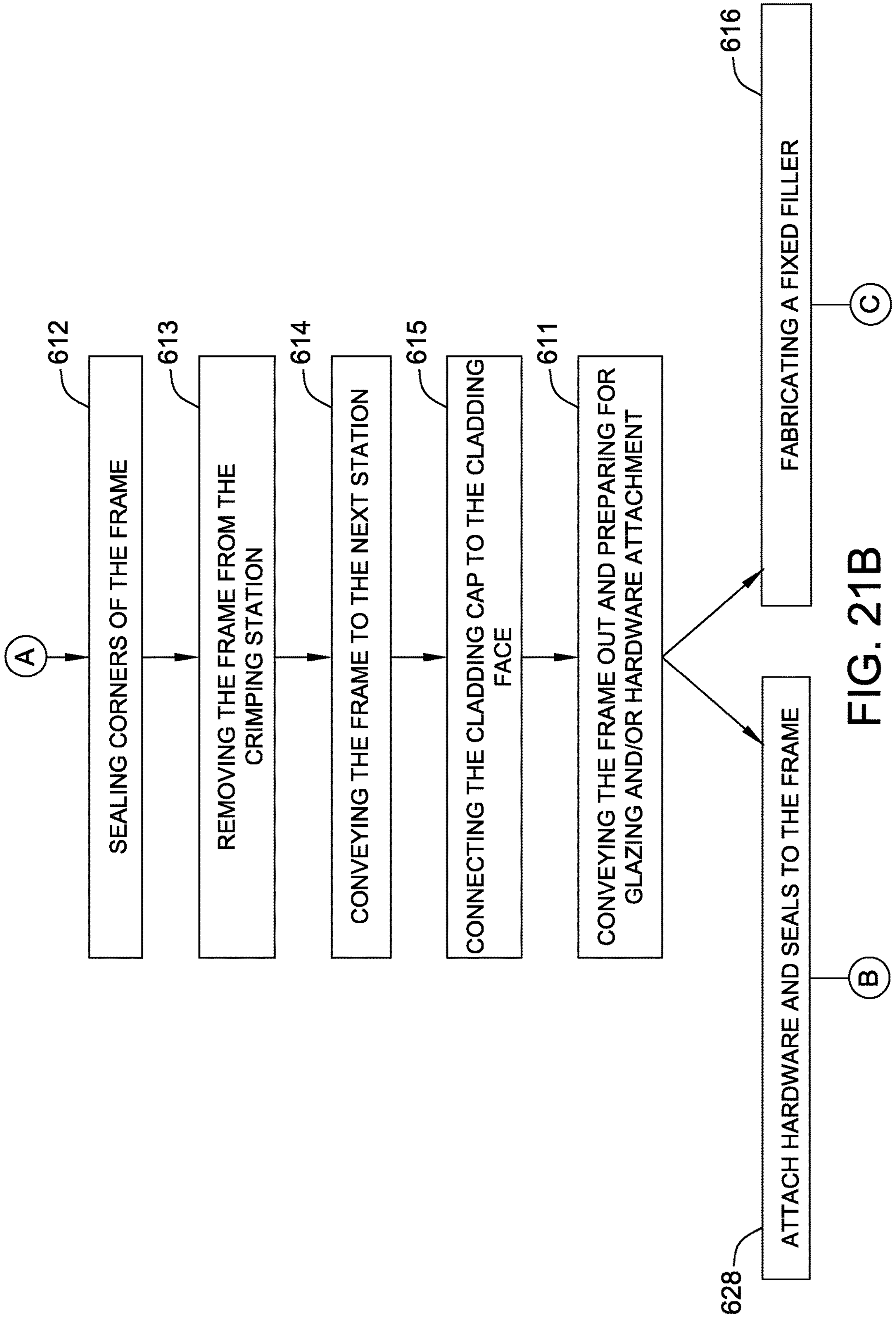
Figure 21C:
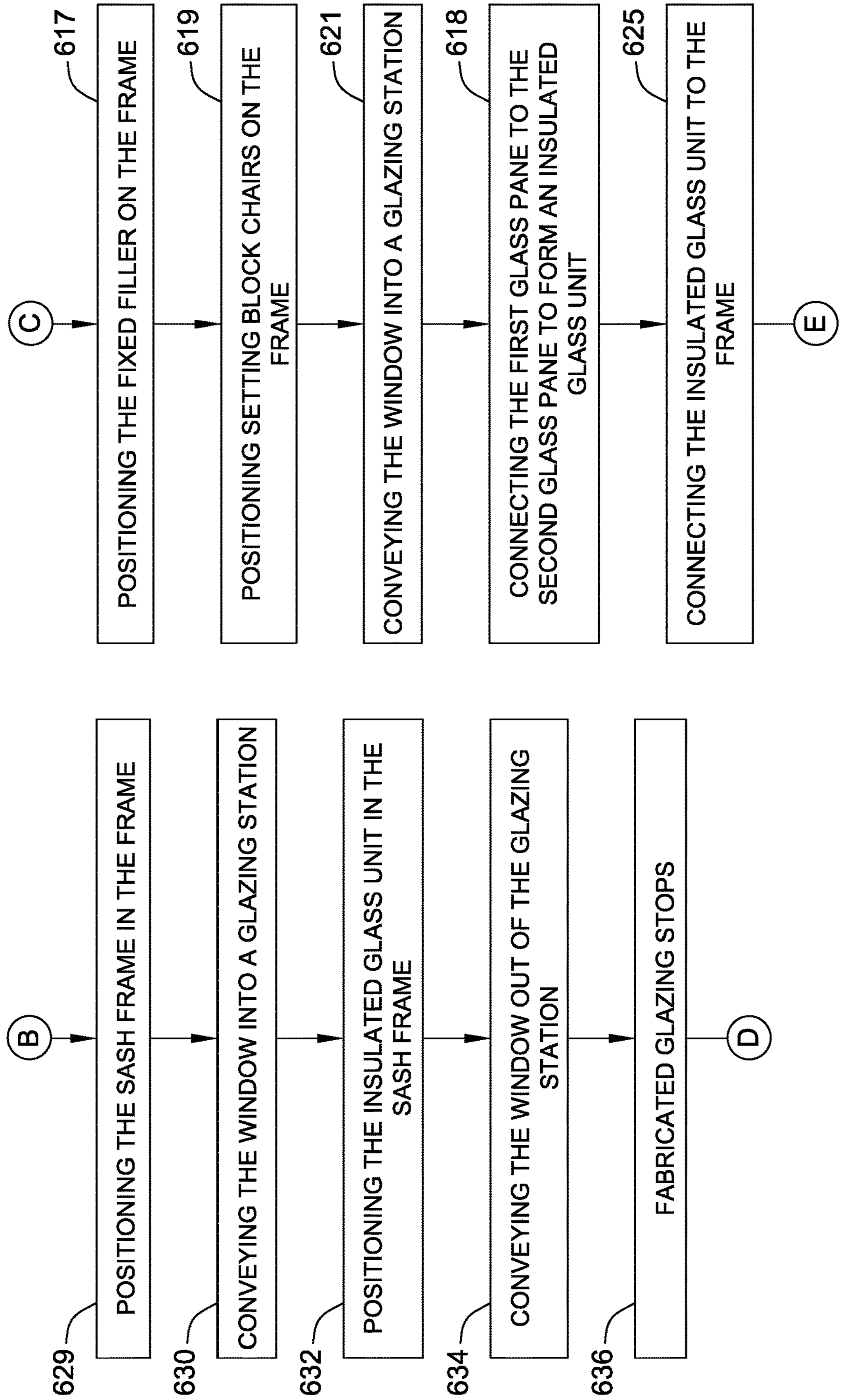
Figure 21D:
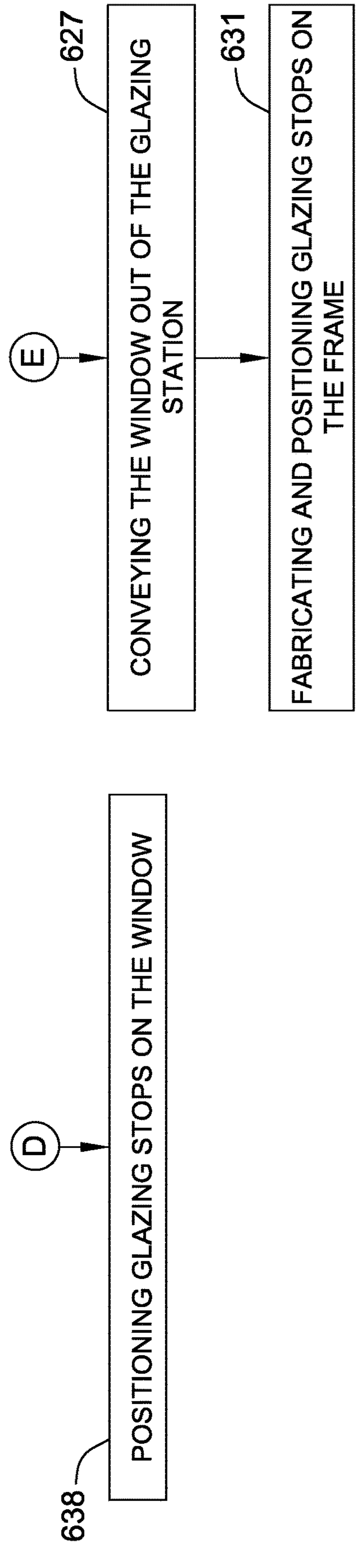

As shown in FIG. 20, in this embodiment, the cladding 536 includes a face 540, a cap 542, and an extension jamb 553. In other embodiments, the window 500 may include any cladding 536 that enables the window to function as described. For example, in some embodiments, the extension jamb 553 is omitted.

The face 540 is configured to connect to the sill 530, the header 532, and the jambs 534. The face 540 includes plates that cover surfaces of the sill 530, the header 532, and the jambs 534. The cap 542 attaches to the face 540. The cladding 536 is connected to the sill 530, the header 532 (shown in FIG. 13), and the jambs 534 (shown in FIG. 13) by a key 544 arranged to engage a keyway 546. The key 544 and the keyway 546 allow the cladding 536 to move relative to the sill 530, the header 532, and the jambs 534. As a result, the key 544 and the keyway 546 enable the cladding 536 to be a different material than the sill 530, the header 532, and the jambs 534.

In this embodiment, the face 540 includes the keyway 546. The keyway 546 includes one or more channels extending along the second side of the frame 506 and at least partially circumscribing the insulated glass unit 502. The sill 530, the header 532, and the jambs 534 each include a portion of the key 544. In this embodiment, the key 544 is spaced from the ends of the face 540 to allow the face 540 and the frame 506 to be positioned relative to each other. In other embodiments, the key 544 and the keyway 546 extend along any portions of the frame 506 that enable the window 500 to operate as described.

The key 544 is shaped to engage the keyway 546 when the key 544 is positioned in the keyway 546. The key 544 and the keyway 546 are sized and shaped to allow the cladding 536 to move relative to the frame 506 when the cladding is coupled to the frame 506 and the key 544 is positioned in the keyway 546. In particular, the keyway 546 is slightly oversized in comparison to the key 544. Accordingly, the key 544 and the keyway 546 allow expansion and contraction of the cladding 536 relative to the sill 530, the header 532 and the jambs 534. As a result, the frame 506 and the cladding 536 allow the window 500 to be constructed of different materials and increase the expected service life of the window. In other embodiments, the cladding 536 may be connected to the frame 506 in any manner that enables the frame 506 to function as described.

In addition, in this embodiment, the external frame 506 and the interior cladding 536 are designed to prevent the cladding 536 from coming into contact with moisture that could infiltrate the window 500 from the exterior. For example, the window 500 may include a cavity 547 extending from the first side 520 to the second side 522 and structurally separating the external frame 506 and the interior cladding 536. Openings 549 may be defined in the sill 530 and/or the jambs 534 and allow moisture to exit the cavity 547. The openings 549 are positioned to inhibit moisture moving to the second side 522 from the first side 520. Specifically, the opening 549 on the first side 520 is positioned on a lower portion of the cavity 547. The opening 549 on the second side 522 is positioned on an upper side of the cavity 547. Accordingly, the frame 506 is configured to prevent damage to the cladding 536 from moisture intruding through the window 500. In other embodiments, the window 500 may include any cavity that enables the window to function as described.

In addition, one or more weather seals 548 are positioned along the cavity 547. The moisture seals 548 extend along the openings 149. In some embodiments, the seals 548 may include a primary seal and a secondary seal. The secondary seal 548 and/or portions of the frame 506 adjacent the seals 548 may be notched or partially opened to allow any moisture to weep out through weep holes 543.

In addition, the frame 506 may include one or more thermal seals 551. For example, the thermal seals 551 may be connected to the frame 506 and the sash frame 524. The thermal seals 551 extend through the cavity 547 and inhibit heat transfer through the cavity. In other embodiments, the frame 506 may include any seals that enable the frame 506 to function as described.

The frame 506 may include any suitable materials. For example, in this embodiment, the jambs 534 include a first material such as aluminum. The cladding 536 includes a second material such as wood. Accordingly, the frame 506 includes at least two different materials. In other embodiments, the frame 506 may include any material such as, for example and without limitation, metal, wood, vinyl, and fiberglass.

Also, in this embodiment, the sash includes sash cladding 556 including a sash cladding face 558 and a sash cladding cap 560. The sash cladding 556 includes the second material and is connected to the sash frame 524 by a key 562 and a keyway 564. In other embodiments, the window 500 includes any cladding that enables the window to function as described.

Figure 18:
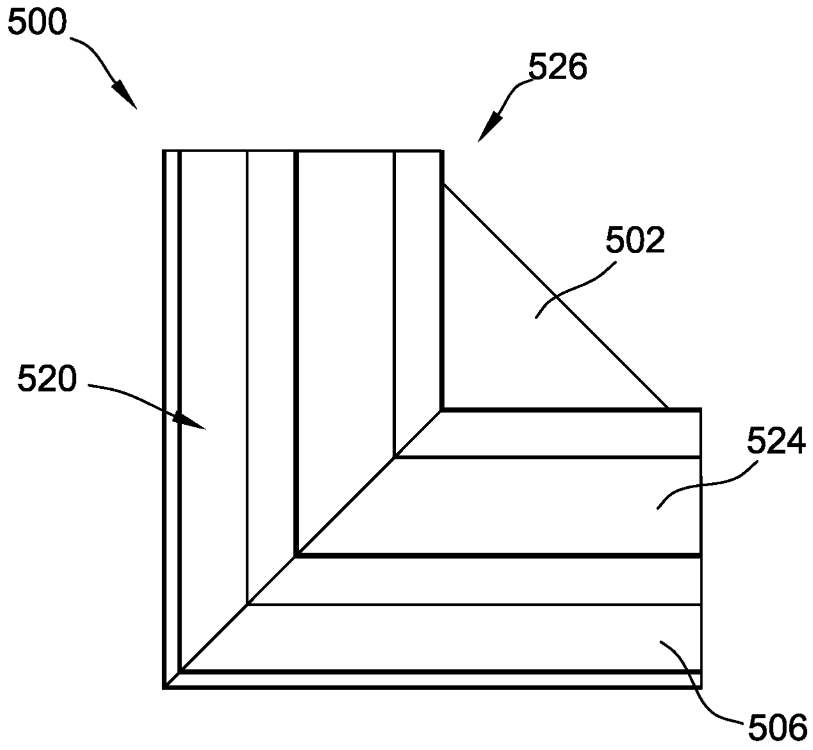
FIG. 18 is an enlarged exterior view of a portion of the window shown in FIG. 13, the window being cut away along section line G-G.
Figure 19:
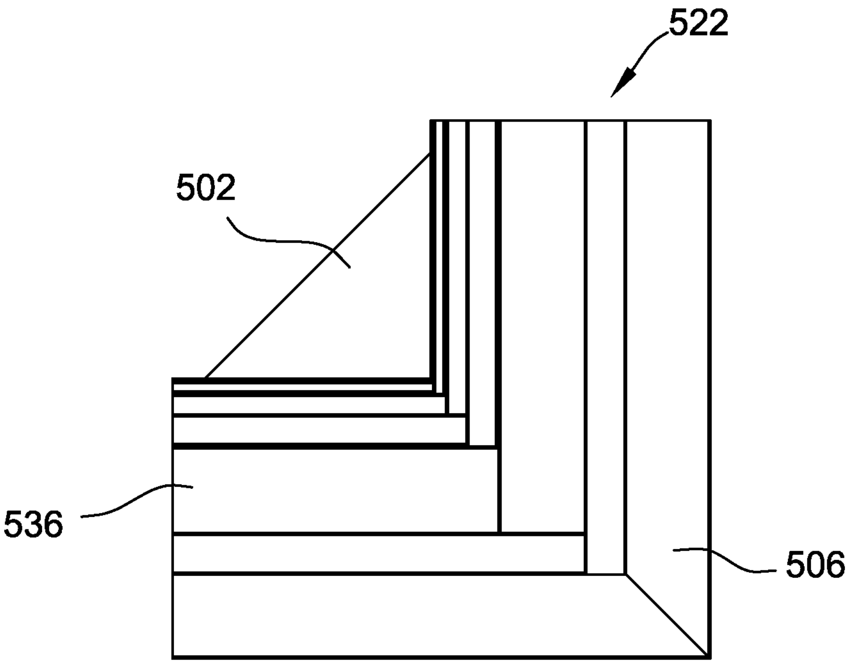
FIG. 19 is an enlarged interior view of a portion of the window shown in FIG. 13, the window being cut away along section line G-G.

In the illustrated embodiment, the first material is visible on a first side 520 of the window 500 (FIG. 18) and the second material is visible on a second side 522 of the window (FIG. 19). The different materials provide different characteristics for the window 500. For example, the first material may increase the strength of the window 500 and the second material may provide a desired appearance for the window. In this embodiment, the window 500 is positioned on a structure such that the second side 522 is on the interior and the first side 520 is on the exterior of the structure. Accordingly, the first material is visible on the exterior and the second material is visible on the interior of the structure. In this embodiment, the window 500 includes a fin 523 to receive fasteners such as nails and screws for mounting the window on the structure. In other embodiments, the window 500 may be mounted in any manner that enables the window to function as described. For example, in some embodiments, the fin 523 is omitted.

In reference to FIG. 20, the frame 506 further defines a thermal cavity 128 intermediate the first side 520 and the second side 522. The thermal cavity 528 has a width in a range of about 1 inch (in.) to about 2 in. The thermal cavity 528 is aligned with the pocket 512 such that the central plane 514 extends through the thermal cavity 528. For example, in some embodiments, a distance between a central plane of the thermal cavity 528 and the central plane 514 of the pocket 512 is in a range up to about 0.5 in. In this embodiment, the thermal cavity 528 and the pocket 512 have a common central plane 514. Accordingly, the thermal cavity 528 and the pocket 512 provide a substantially continuous thermal break extending through the window 500 to reduce the transfer of heat through the window. In other embodiments, the window 500 may have any thermal cavity 528 that enables the window to operate as described.

In addition, the sash frame 524 defines a sash thermal cavity 550 intermediate the first side 520 and the second side 522. The sash thermal cavity 550 is aligned with the pocket 512 such that the central plane 514 extends through the sash thermal cavity when the sash is in a closed position. For example, in some embodiments, a distance between a central plane 533 of the thermal cavity 550 and the central plane 514 of the pocket 512 is in a range up to about 0.5 in. In other embodiments, the window 500 may include any thermal cavity that enables the window to function as described. For example, in some embodiments, the sash frame 524 does not necessarily include a thermal cavity 550. In further embodiments, the window 500 includes three or more thermal cavities.

An insulating material 552 having a thermal conductance less than the first material and/or the second material is positioned within the thermal cavity 528 and the sash thermal cavity 550. For example, the insulating material 552 may have a thermal conductance in a range of about 0.21 British thermal units per hour square feet degrees Fahrenheit (Btu/(hr·ft$^{2}$·° F.)) to about 0.840 Btu/(hr·ft$^{2}$·° F.). The insulating material 552 substantially fills the thermal cavity 528 and extends between portions of the frame 506 including the first material and/or the second material to reduce heat transfer through the window. In other embodiments, the window 500 may include any insulating material 552 that enables the window to operate as described.

In reference to FIGS. 20 and 21-D, a method 600 of assembling the window 500 includes aligning 626 the thermal cavity 528 and the pocket 512 such that the central plane 514 of the thermal cavity extends through the pocket. Accordingly, the thermal cavity 528 and the pocket 512 provide a continuous thermal break throughout the window 500 to inhibit heat transfer through the window. In some embodiments, extrusions for the frame 506 are designed to provide alignment of the thermal cavity 528 and the pocket 512. In other embodiments, the thermal cavity 528 and the pocket 512 may be aligned in any manner that enables the window 500 to operate as described.

Also, the method includes positioning 601 insulating material 552 in the thermal cavity 528 defined by the frame 506 intermediate the first side 520 and the second side 522. In addition, the method includes fabricating 602 components for the frame 506, the face 540, and the cap 542. For example, the sill 530, the header 532, and the jambs 534 may be cut for the frame 506 from a material such as aluminum. In addition, the sill 530, the header 532, and/or the jambs 534 may be cut for the face 540 and the cap 542 of the cladding 536 from a material such as wood. In other embodiments, the frame 506 may be fabricated in any manner that enables the frame to function as described. In some embodiments, components such as the cap 542 may be omitted.

The frame 506 may be assembled by positioning 604 each corner key 538 into the opening 545 in one of the header 532 and the sill 530 and into the opening 545 in one of the jambs 534 to form corners of the frame. The cladding face 540 may be positioned 606 on the sill 530, the header 532, and the jambs 534. With the corner keys 538 maintaining the frame 506 in position, the sill 530, the header 532, and the jambs 534 may be conveyed 607 into a station and connected 608 at the corners. For example, the corners of the frame 506 may be crimped to secure the sill 530, the header 532, and the jambs 534 together. In addition, the method 600 includes connecting 610 the cladding face 540 to the frame 506. In some embodiments, the cladding face 540 may be secured to the sill 530, the header 532, and the jambs 534 at the same time that the sill 530, the header 532, and the jambs 534 are secured together. The cladding face 540 may be secured using nails. The corners of the frame 506 may be sealed 612 by at least partially filling the openings 545 with sealant. In addition, after the corners are sealed 212, the frame 506 may be removed 613 from the crimping station and conveyed 614 to the next station. The cap 542 may be connected 615 to the face 540 after the face is connected to the frame 506. For example, the frame 506 may be conveyed into a nailer station and the cap 542 nailed to the face. In other embodiments, the frame 506 may be assembled in any suitable manner using, for example and without limitation, adhesives, fasteners, and/or any other suitable attachment means. After, connecting 615 the face, the frame 506 is conveyed 611 out and prepared for glazing and/or hardware attachment.

In some embodiments, the frame 506 is mounted in a wall of a structure such that first side 520 is positioned on the exterior of the structure and the second side 522 is positioned on the interior of the structure. Accordingly, the cladding 536 may be connected to the second side 522 of the window such that the cladding 536 is visible on the interior of the structure. In other embodiments, the cladding 536 may be connected to the sill 530, the header 532, and/or the jambs 534 in any manner that enables the window 500 to operate as described.

To assemble windows 500 that include fixed insulated glass units 502, the method 600 includes fabricating 616 and positioning 617 a fixed filler on the frame 506. In addition, setting block chairs are positioned 619 on the frame 506. The window 500 is conveyed 621 into a glazing station. In the glazing station, the window 500 is glazed. For example, the method includes connecting 618 the first glass pane 508 to the second glass pane 510 to form an insulated glass unit 502. The insulated glass unit 502 is connected 625 to the frame 506. The insulated glass unit 502 may be connected to the frame 506 by positioning seals or applying sealant on the frame 506 and positioning the insulating glass unit 502 on the sealant. After glazing, the window 500 is conveyed 627 out of the glazing station. Glazing stops 507 are fabricated 631 and positioned on the frame 506.

To assemble windows 500 that are operable (i.e., positionable between opened and closed positions), the insulated glass unit 502 may be included in the sash 526 positioned in the frame 506. For example, hardware and seals are attached 628 to the frame 506. The sash frame 524 is positioned 629 in the frame 506. The sash frame 524 may be positioned such that it is movable, e.g., pivotable and/or slidable, relative to the frame 506. The window 500 is conveyed 630 into a glazing station and the insulated glass unit 502 is positioned 632 in the sash frame 524. For example, in some embodiments, setting block chairs may be positioned on the sash frame 524 and used to support the insulated glass unit 502 in the sash frame 524. The window 500 is conveyed 234 out of the glazing station and glazing stops are fabricated 636 and positioned 638 on the window 500.

Figure 22:
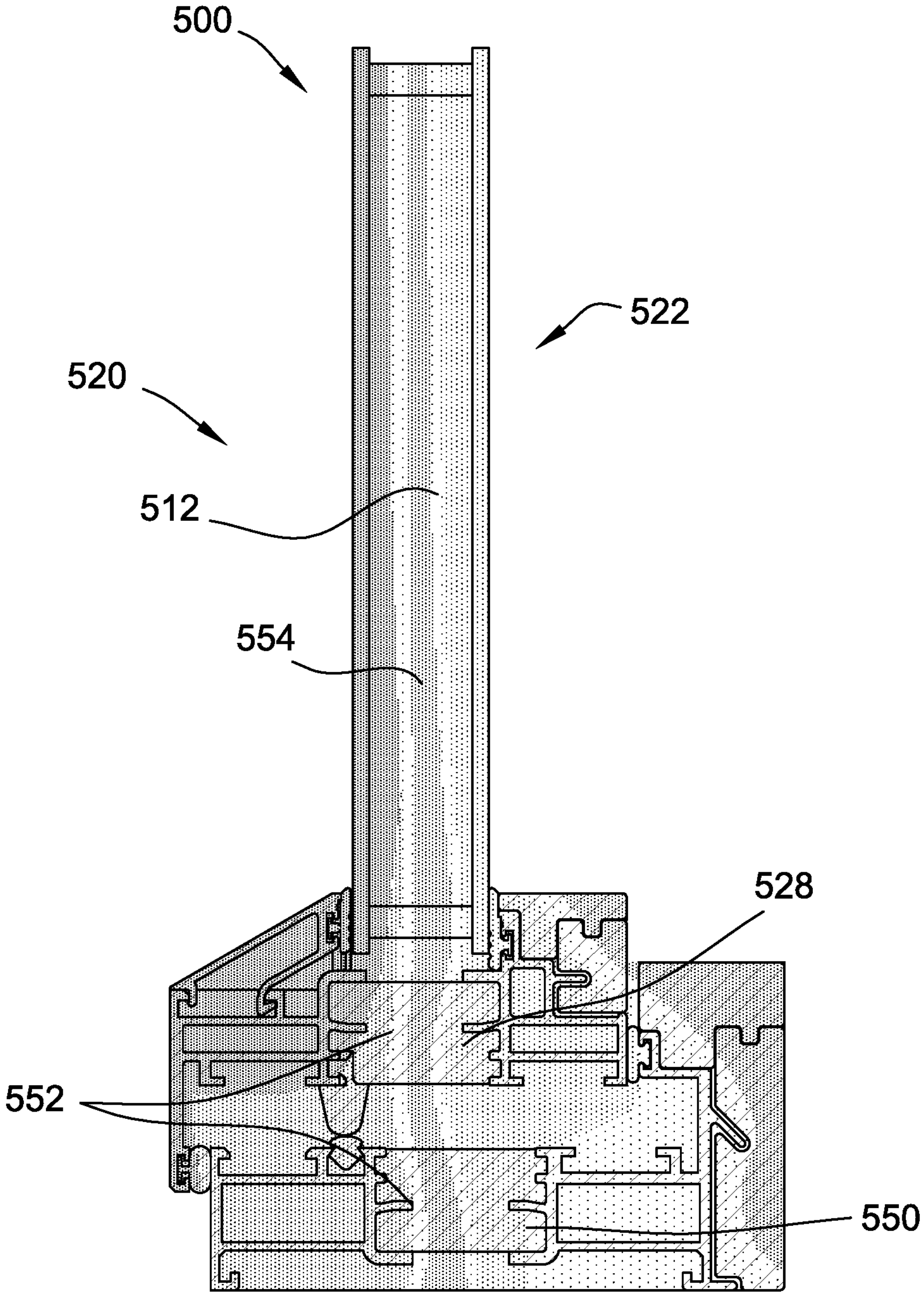
FIG. 22 is a schematic sectional view showing temperature zones of the window shown in FIG. 13, taken along section line I-I.

FIG. 22 is a sectional view showing temperature zones of the window 500. For example, the window 500 may be positioned in the wall of a structure such that the first side 520 is on an exterior of the structure and the second side 522 is on an interior of the structure. In the illustrated embodiment, the first side 520 has a first temperature and the second side 522 has a second temperature. In this embodiment, the second temperature is greater than the first temperature because the interior of the structure is warmer than the exterior. Accordingly, heat has a tendency to flow from the interior of the structure towards the exterior. In other embodiments, the exterior may be warmer than the interior.

As shown in FIG. 22, the thermal cavity 528 and the pocket 512 define a substantially continuous thermal break 554 extending throughout the window 500. The thermal break 154 interrupts the transfer of heat from the first side 520 to the second side 522. Accordingly, the second side 522 is able to have a temperature that is significantly less than the temperature of the first side 520. As a result, the window 500 reduces the transfer of heat between the exterior and the interior of structure.

Figure 23:
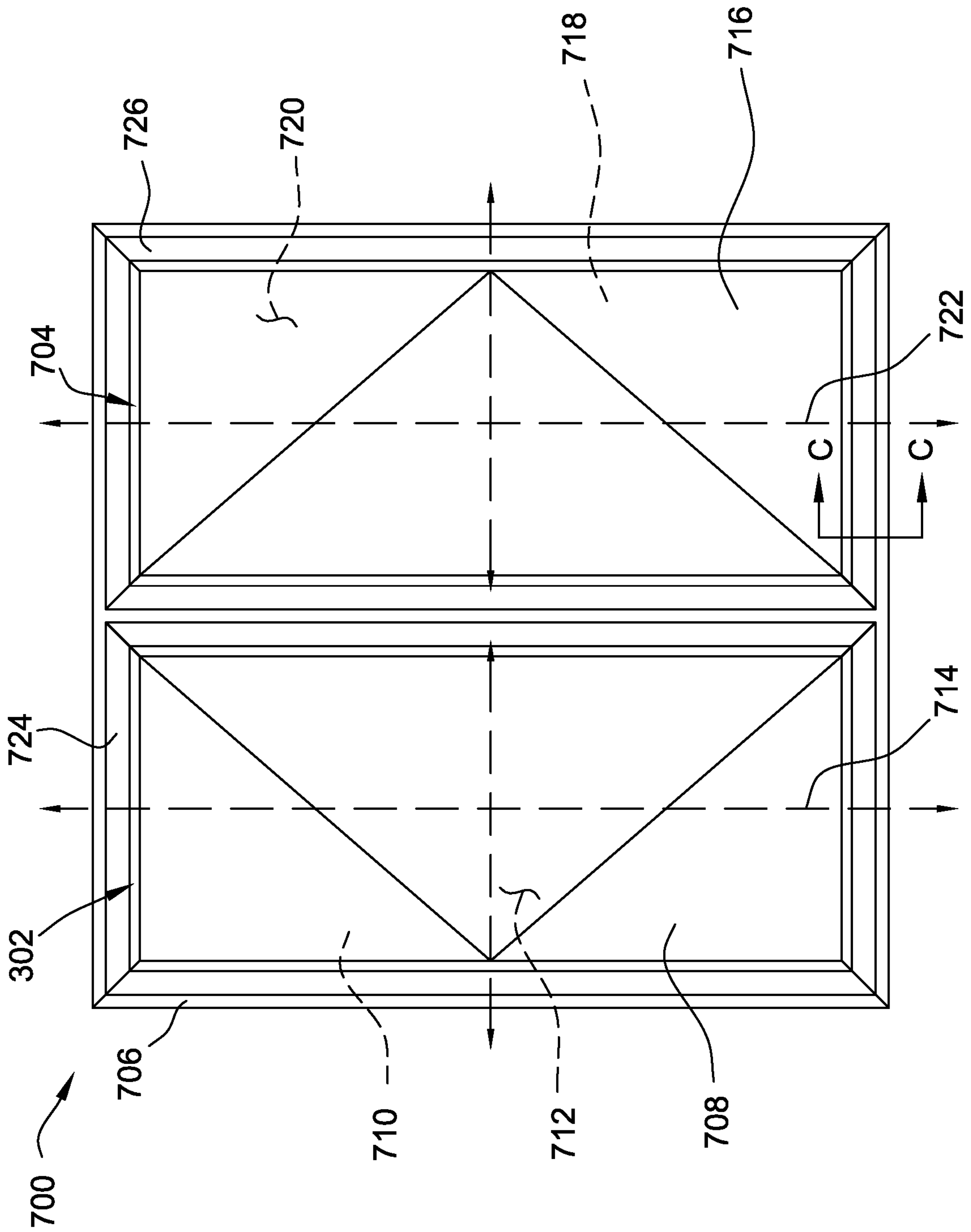
FIG. 23 is an elevation view of an example window including sashes.

FIG. 23 is an elevation view of a window 700 including sashes. In reference to FIG. 22, the window 700 includes a first insulated glass unit 702, a second insulated glass unit 704, and a frame 706. The first insulated glass unit 702 includes a first glass pane 708 and a second glass pane 710. The second glass pane 710 is spaced from the first glass pane 708 such that the first glass pane and the second glass pane define a pocket 712 therebetween. A central plane 714 extends through the pocket 712 and is spaced equal distances from the first glass pane 708 and the second glass pane 710. The second insulated glass unit 704 includes a third glass pane 716 and a fourth glass pane 718. The fourth glass pane 718 is spaced from the third glass pane 716 such that the third glass pane and the fourth glass pane define a pocket 720 therebetween. A central plane 722 extends through the pocket 720 and is spaced equal distances from the third glass pane 716 and the fourth glass pane 718. The pockets 712, 720 may be filled with a gas such as argon to reduce the transfer of heat through the window 700. In other embodiments, the window 700 may include any insulated glass unit that enables the window to function as described.

In addition, the window 700 includes a first sash frame 724 and a second sash frame 726. The first sash frame 724 circumscribes the first insulated glass unit 702 and the second sash frame 726 circumscribes the second insulated glass unit 704. In the example, the first insulated glass unit 702 and the first sash frame 724 form a first sash and the second insulated glass unit 704 and the second sash frame 726 form a second sash. In other embodiments, the window 700 may include any sashes that enable the window to function as described.

In this embodiment, the first sash frame 724 and the second sash frame 726 are configured to pivot relative to the frame 506. The central plane 714 of the first insulated glass unit 702 and the central plane 722 of the second insulated glass unit 704 are aligned when the first sash and the second sash are in a first, i.e. closed, position. The central plane 714 of the first insulated glass unit 702 and the central plane 722 of the second insulated glass unit 704 may be unaligned and extend at an angle relative to each other when at least one of the sashes is in a second, i.e., opened, position. Accordingly, the window 700 is a casement window. In other embodiments, the window 700 may have any sashes that enable the window 700 to function as described. For example, in some embodiments, the central plane 714 of the first insulated glass unit 702 is offset from the central plane 722 of the second insulated glass unit 704 to enable at least one of the first sash and the second sash to move relative to the other. In further embodiments, the first sash frame 724 and/or the second sash frame 726 may be omitted and the first insulated glass unit 702 and/or the second insulated glass unit 704 may be fixed relative to the frame 706.

The frame 706 includes at least one thermal cavity extending between first and second sides of the frame and generally circumscribing the first insulated glass unit 702 and the second insulated glass unit 704. The first insulated glass unit 702, the second insulated glass unit 704, and the thermal cavities are positioned such that the central planes 714, 722 extend through the thermal cavity. Accordingly, the first insulated glass unit 702, the second insulated glass unit 704, and the thermal cavities provide a continuous thermal break extending throughout the window 700.

In some embodiments, at least a portion of the frame 706 of the window 700 may form a louver (not shown). In such embodiments, the insulated glass units 702, 704 may be omitted from the portion of the frame 706 forming the louver. For example, the frame 706 may define an opening configured to receive vents, fans, and/or air conditioning units. In other embodiments, the frame 706 may be configured to receive any components that enable the window 700 to function as described.

Figure 24:
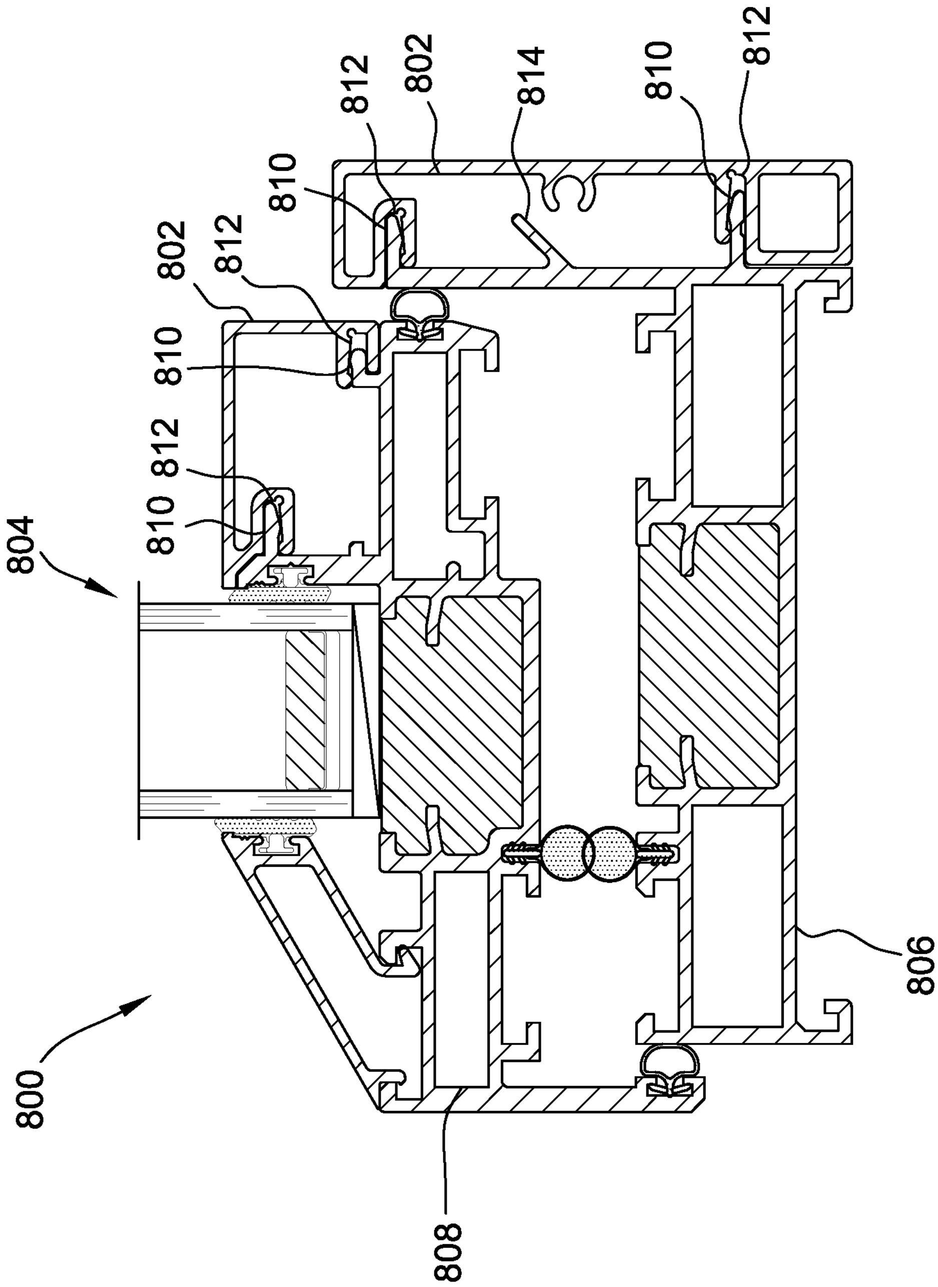
FIG. 24 is a sectional view of a portion of an example window including cladding.

FIG. 24 is a sectional view of a portion of an example window 800 including cladding 802. The window 800 includes an insulated glass unit 804, a frame 806, and a sash frame 808. As shown in FIG. 24, in this embodiment, the cladding 802 is configured to connect to the frame 806 and the sash frame 808. For example, the frame 806 and the sash frame 808 each include clips 810 that extend into and engage cavities 812 in the cladding 802. Accordingly, the cladding 802 is configured to snap into position on the frame 806 and the sash frame 808 without the use of tools.

In addition, in this embodiment, the frame 806 and the sash frame 808 each include keys 814 that allow the frame and the sash frame to connect to different cladding. For example, the keys 814 may engage the keyways 546 (shown in FIG. 20 in the cladding 536). In other embodiments, the cladding 802 may be connected to the frame 806 and the sash frame 808 in any manner that enables the window 800 to function as described. For example, in some embodiments, the cladding 802 may include clips 810 and the frame 806 and the sash frame 808 may include cavities 812.

In this embodiment, the cladding 802 includes a metal such as aluminum. In other embodiments, the cladding 802 may include any materials that enable the cladding to function as described. For example, in some embodiments, the cladding 802 may include, without limitation, metal, wood, vinyl, and/or fiberglass.

Compared to conventional doors and windows, the doors and windows of embodiments of the present disclosure have several advantages. For example, embodiments of the doors and windows include different materials that provide increased strength, a desired aesthetic appeal, and/or increased thermal characteristics in comparison to conventional doors. In addition, the doors and windows include a thermal break aligned with a glass pocket to provide a substantially continuous thermal break extending through the doors. Accordingly, the doors and windows reduce heat transfer through the doors and windows. Also, embodiments of the doors and windows include a cavity between the external frame and interior cladding material designed to prevent the interior cladding material from coming into contact with moisture that could infiltrate the door and window from the exterior. Moreover, embodiments of the door and window cost less to assemble than other types of doors and windows.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A building component comprising:

a double pane insulated glass unit including:

a first glass pane having an outer surface; and a second glass pane having an outer surface, wherein the second glass pane is spaced from the first glass pane, the first glass pane and the second glass pane defining a pocket therebetween, wherein a central plane extends through the pocket and is spaced equal distances from the first glass pane and the second glass pane;

a building component frame including a first side, a second side, and a middle portion intermediate the first side and the second side, the first glass pane of the double pane insulating glass unit is an outermost pane on the first side of the building component frame and the second glass pane of the double pane insulating glass unit is an outermost pane on the second side of the building component frame; and an insulating material in the middle portion of the building component frame, the insulating material defining a continuous frame thermal break circumscribing the double pane insulated glass unit and extending through the building component frame, the insulating material having a thermal conductance in a range of 0.21 British thermal units per hour square feet degrees Fahrenheit (Btu/(hr·ft$^{2}$·° F.)) to 0.84 Btu/(hr·ft$^{2}$·° F.), a panel frame circumscribing the double pane insulated glass unit and positioned in the building component frame, wherein the panel frame and the double pane insulated glass unit are at least one of pivotable and slidable when positioned in the building component frame, wherein the panel frame includes an insulating material defining a panel thermal break intermediate the first side and the second side, wherein the panel thermal break is aligned with the pocket such that the central plane extends through the panel thermal break when the building component is in a closed position, wherein the central plane extends through a center of the panel thermal break and forms a common central plane of the building component with substantially equal portions of the panel thermal break extending on each side of the common central plane when the building component is in a closed position, and wherein the frame thermal break has a width of at least 1 inch, and wherein the pocket has a width that is less than the width of the frame thermal break.

2. The building component of claim 1, wherein a distance between a central plane of the frame thermal break and the central plane of the pocket is in a range of up to 0.5 inches.

3. The building component of claim 1, wherein the width of the frame thermal break is in a range of 1 inch to 2 inches.

4. The building component of claim 1, wherein the building component frame includes at least one of metal, wood, vinyl, and fiberglass.

5. The building component of claim 1, wherein the building component frame includes a header, a sill, jambs, and corner keys, wherein each corner key extends into a first opening in one of the header and the sill and into a second opening in one of the jambs to form a corner of the building component frame.

6. The building component of claim 1, further comprising cladding connected to the building component frame, wherein the cladding includes at least one of metal, wood, vinyl, and fiberglass.

7. The building component of claim 6, wherein one of the building component frame and the cladding includes a keyway and the other of the building component frame and the cladding includes a key extending into the keyway, wherein the keyway is sized to allow the building component frame and the cladding to move relative to each other.

8. The building component of claim 1, wherein the building component frame defines a cavity that extends between the first side and the second side and inhibits moisture from the first side from contacting a material on the second side.

9. The building component of claim 8, wherein the building component frame includes a seal extending at least partly along the cavity.

10. The building component of claim 1, in combination with a wall of a structure in which the building component is mounted, the structure including an interior and an exterior, the building component is mounted in the wall such that the first glass pane is on the exterior of the structure and the second glass pane is on the interior of the structure.

11. The building component of claim 1, wherein the building component comprises a door.

12. The building component of claim 11, wherein the door includes a single panel including the double pane insulated glass unit.

13. The building component of claim 12, wherein the single panel is movable relative to the building component frame.

14. The building component of claim 13, wherein the door includes hinges, the single panel being pivotable on the hinges relative to the building component frame.

15. A building component comprising:

a double pane insulated glass unit including:

a first glass pane having an outer surface; and a second glass pane having an outer surface, wherein the second glass pane is spaced from the first glass pane, the first glass pane and the second glass pane defining a pocket therebetween, wherein a central plane extends through the pocket and is spaced equal distances from the first glass pane and the second glass pane;

a building component frame including a first side, a second side, and a middle portion intermediate the first side and the second side, wherein the middle portion of the building component frame comprises an insulating material defining a frame thermal break, wherein the frame thermal break is aligned with the pocket such that the central plane extends through the frame thermal break, the first glass pane of the double pane insulating glass unit is an outermost pane on the first side of the building component frame and the second glass pane of the double pane insulating glass unit is an outermost pane on the second side of the building component frame; and a panel frame circumscribing the double pane insulated glass unit and positioned in the building component frame, the panel frame including a first side, a second side, and a middle portion intermediate the first side and the second side, wherein the middle portion of the panel frame comprises an insulating material defining a panel thermal break circumscribing the double pane insulated glass unit, wherein the panel thermal break is aligned with the pocket such that the central plane extends through a center of the panel thermal break and forms a common central plane of the building component with substantially equal portions of the panel thermal break extending on each side of the common central plane, wherein the frame thermal break, the panel thermal break, and the pocket define a continuous thermal break extending through the building component when the building component is in a closed position, wherein the panel thermal break has a width of at least 1 inch, and wherein the pocket has a width that is less than the width of the panel thermal break.

16. The building component of claim 15, wherein the width of the panel thermal break is in a range of 1 inch to 2 inches.

17. The building component of claim 15, wherein the building component frame includes a header, a sill, jambs, and corner keys, wherein each corner key extends into a first opening in one of the header and the sill and into a second opening in one of the jambs to form a corner of the building component frame.

18. The building component of claim 15, further comprising cladding connected to the building component frame, wherein one of the building component frame and the cladding includes a keyway and the other of the building component frame and the cladding includes a key extending into the keyway, wherein the keyway is sized to allow the building component frame and the cladding to move relative to each other.

19. The building component of claim 15 wherein the insulating material defining a panel thermal break circumscribing the double pane insulated glass unit is the same as the insulating material defining a panel thermal break circumscribing the double pane insulated glass unit.

20. The building component of claim 15 wherein the insulating material defining a panel thermal break circumscribing the double pane insulated glass unit has a thermal conductance in a range of about 0.21 British thermal units per hour square feet degrees Fahrenheit (Btu/(hr·ft$^{2}$·° F.)) to about 0.84 Btu/(hr·ft$^{2}$·° F.).

21. The building component of claim 15, wherein the building component comprises a door.

22. The building component of claim 21, wherein the door includes a single panel including the double pane insulated glass unit and the panel frame.

23. The building component of claim 22, wherein the single panel is movable relative to the building component frame.

24. The building component of claim 23, wherein the door includes hinges, the single panel being pivotable on the hinges relative to the building component frame.

* * * * *